United States Patent [19]

Yen

[11] Patent Number: 4,890,249

[45] Date of Patent: Dec. 26, 1989

[54] DATA COMPRESSION AND DECOMPRESSION FOR DIGITAL RADAR LANDMASS SIMULATION

[75] Inventor: Craig S. Yen, Fairfax County, Va.

[73] Assignee: Hughes Simulation Systems, Inc., Herndon, Va.

[21] Appl. No.: 168,768

[22] Filed: Mar. 16, 1988

[51] Int. Cl.[4] ............... G06F 3/153; G06F 15/66
[52] U.S. Cl. ............... 364/578; 358/103; 364/518; 364/522; 382/56
[58] Field of Search ............... 364/516, 518, 522, 578; 434/2, 3; 382/56

[56] References Cited

U.S. PATENT DOCUMENTS

| | | | |
|---|---|---|---|
| 3,769,442 | 10/1973 | Heartz et al. | 364/516 |
| 4,017,985 | 4/1977 | Heartz | 434/2 |
| 4,168,582 | 9/1979 | Heidrich | 434/2 |
| 4,204,342 | 5/1980 | Linfield | 434/2 |
| 4,489,389 | 12/1984 | Beckwith et al. | 364/522 |
| 4,520,506 | 5/1985 | Chan et al. | 382/56 |
| 4,555,802 | 11/1985 | Fedak et al. | 382/56 |
| 4,666,407 | 5/1987 | Jones | 434/2 |
| 4,724,483 | 2/1988 | Shinada | 382/56 X |
| 4,780,084 | 10/1988 | Donovan | 434/2 |

Primary Examiner—Felix D. Gruber
Attorney, Agent, or Firm—Whitham & Marhoefer

[57] ABSTRACT

A unique digital radar landmass simulator (DRLMS) uses different culture data compression techniques and hardware from that used in the conventional DRLMS systems. The application of these techniques to DRLMS results in a system that is small in size and high in performance. During the data base preparation, Defense Mappinig Agency (DMA) Digital Terrain Elevation Data (DTED) and Digital Feature Analysis Data (DFAD) data are processed and compressed for elevation, reflectivity and aspect channels with different compression schemes. The compressed data is then stored on disks for each channel. Dedicated decompression hardware for each channel then retrieves, decompresses, and reconstructs the data. The culture compression and decompression hardware uses a run length compression technique that results in the capability of presenting a very detailed culture map for the terrain. The elevation compression uses a table look-up technique that generates high resolution terrain data. The coordination of the timing of the several channels in order to generate the final display is accomplished by designating one of the channels as a master channel to maintain synchronism among the channels.

12 Claims, 15 Drawing Sheets

DATA COMPRESSION AND DECOMPRESSION FOR DIGITAL RADAR LANDMASS SIMULATION

BACKGROUND OF THE INVENTION

1. Field of the Invention

The present invention generally relates to a real time data retrieval system and, more particularly, to culture and terrain data compression and reconstruction for digital radar landmass simulation.

2. Description of the Prior Art

Computer image generation (CIG) is used in visual training simulators which present scenes to an observer or trainee to allow the observer to practice some task, such as flying an airplane. In a flight simulator, for example, a three-dimensional model of the desired "gaming area" is prepared and stored on magnetic disk or similar bulk storage media. The visual simulator combines an image generator with an electro-optical display system such as a cathode ray tube (CRT) or similar display. The image generator reads in blocks of three-dimensional data from the disk and transforms this data into two-dimensional scene descriptions. The two-dimensional data are converted to analog video that is presented to the operator or trainee via the display. The generated imagery is meant to be representative of the true scenes that the operator would see out of a window if the operator were actually performing the task being simulated. The generation of the display images is said to be in "real time" which is normally taken to mean 30 frames per second, as in the U.S. television standard. CIG systems are described in detail in the book entitled *Computer Image Generation* edited by Bruce J. Schacter and published by Wiley-Interscience (1983).

One of the most important aircraft instruments is radar, and radar simulation is an important tool for the training of pilots. There has been much progress in radar in the recent years in terms of higher resolution. Typically, the radar is used for obstacle avoidance, navigation in poor weather, and target acquisition, among other things. Accordingly, a digital radar land mass simulator (DRLMS) has to be able to process the ever increasing amount of land mass data for large gaming areas in real time. Data compression and data retrieval have become a critical area where new techniques and hardware are needed to be developed that are cost effective and support the higher throughput rate required for DRLMS.

U.S. Pat. No. 3,769,442 to Heartz discloses a digital radar land mass simulator wherein the cultural features and prominent terrain features such as ridges and valleys are described by means of a sequence of connected edges. Each edge is defined by the two end positions in x,y,z coordinates and the direction. This edge information is stored in an on-line memory. The real time hardware then interpolates between the end points of the data along the edge. This technique can generate good data compression when the number of edges are long. This technique is only for the encoding of prominent terrain features and does not apply to the compression of a geographical area at a resolution of 30 meters for Defense Mapping Agency (DMA) level II and 100 meters for DMA level I. In a later patent, No. 4,017,985, Heartz discloses a system wherein the terrain is fitted with a number of faces enclosed by edges. The terrain along a radial sweep is calculated by its intersection with the faces. For large faces, the compression ratio is high. However, for high resolution data bases, when the number of faces approaches the number of display pixel elements, the data stored for the faces may exceed the data otherwise stored for each pixel, and the advantage of this compression technique diminishes.

Others have described data compression and reconstruction techniques in digital moving map displays. The requirements for data retrieval, compression and reconstruction are similar between digital moving map displays and DRLMS. As one example, U.S. Pat. No. 4,520,506 to Chan et al. describes a modified boundary/footprint approach for the compression of culture features. The scheme is that the compression of culture including linear and area data, is based upon a line generating technique, knowing the starting and the end point data and the gradient in between. To reconstruct an area knowing the information describing the edges enclosing it, a scan line data can be filled in knowing the end point values defined by the intersections of the scan line with the left and right edges of an area. The area, line and point data are reconstructed in decending priority. Again, the compression technique is to encode the feature data in terms of the end points of an edge. Large compression can be achieved when the lines are long and the surfaces are large.

In essence, the above compression techniques for culture data amounts to generating lines and polygons for data compression. The amount of data compression is directly related to the sizes of the edges and faces of the polygons. These techniques are more suitable to fewer numbers of features in the data base.

On commercially available high performance DRLMS systems, the elevation compression uses polynomials to envelope the gridded elevation data from the DMA. The compressed data are the coefficients for the polynomials. To decompress the data off-line, huge amounts of hardware are needed, contributing to higher equipment costs.

New compression techniques need to be developed to simulate the modern radar requirements of higher resolution imagery. The recent advances in very large scale integrated (VLSI) memory circuits has made possible certain techniques that are memory intensive instead of processing intensive. Consequently, through the application of new compression techniques, the amount of hardware for DRLMS on line processing has been greatly reduced to achieve equal or better fidelity than conventional methods.

SUMMARY OF THE INVENTION

It is therefore an object of the present invention to provide an improved digital radar land mass simulator that provides real time simulation of very high density "busy" culture and elevation area displays.

It is another object of the invention to provide a digital radar land mass simulator in which the hardware required is simplified while at the same time increasing image fidelity.

It is a further object of the invention to apply new data compression techniques to digital radar land mass simulators to meet the requirements of simulating modern, high resolution radars.

The present invention entails the compression of the culture and elevation data from the Defense Mapping Agency (DMA) source for a digital radar land mass simulator. The data obtained from the DMA for a specific gaming area includes Digital Feature Analysis Data (DFAD) and Digitial Terrain Elevation Data (DTED). The DFAD is the so-called culture or reflectivity data and is supplied in the form of polygon and vector data; i.e., line, point and aerial descriptors. Contrary to the conventional culture compression techniques for DRLMS that use edges to describe line and area features, the technique described herein processes the DMA data into a gridded format. Run length compression on a row-by-row basis is then applied to the grids. The DTED is itself a gridded data base, but it must be converted to a gridded data base conforming to the conventions of the invention. Both elevation and aspect data are derived from the DTED. Data compression is performed off line by a host data processing system, and the compressed data is stored on disks for later retrieval and processing by the DRLMS.

The DRLMS according to the invention is, in its preferred embodiment, implemented as a target generator and a four channel system comprising aspect, elevation, reflectivity and weather channels. The last of these, the weather channel, is optional and may be omitted for some applications. Each channel has its own microprocessor as a controller which reads the compressed data from disk to dedicated decompressor hardware which reconstructs the aspect, elevation, culture or reflectivity, and weather data in real time for radar processing. In the reflectivity or culture channel, run length decompression is used. In the elevation channel, the compressed data is reconstructed using table lookup techniques, while in the aspect channel, the compressed data is reconstructed using a combination of run length decompression and table lookup techniques.

Considering, for example, the reflectivity or culture channel, for a 25 nm range scale, the tile chosen for compression is a $1024 \times 1024$ gridded tile for a one degree Longitude by one degree Latitude area. The data base program selects from the DMA level I Digital Feature Analysis Data (DFAD) tapes features that fall in a tile. For features that fall between two neighboring tiles, a clipping algorithm is applied. From the surface material category (SMC) and the feature identification code (FIC), sixteen reflectivity values are assigned to the features. Separate off line programs are used to create the reflectivity value for each grid point from area features, linear features and point features. These features may overlay one another, but they would be in the priority given by the DMA, instead of assigning highest priority for point, lower priority for line and lowest priority for area features. The result is a tile of gridded $1024 \times 1024$ reflectivity data for compression. The data is then compressed from left to right for each of the 1024 rows. For the 1024 gridded data of a row, because of the restriction of the decompressor hardware, the maximum run length allowed for each run is 256 long. Run lengths greater than that are broken down to portions of 256 long or less. The compressed data is stored in a Winchester disk to be retrieved by the reflectivity channel microprocessor.

The decompressed data for each channel is temporarily stored in separate channel image memories. An aspect computer processes decompressed aspect data to produce surface normals and then calculates the dot products between radar incident vectors and the surface normals to generate the aspect radar returns. The elevation data is used to calculate the shadowing due to terrain. Slant range is calculated from ground range and the elevation data. Weather attenuation hardware retrieves weather map data and calculates attenuation due to weather. The radar equation hardware receives the reflectivity data, along with the calculated aspect, shadowing and weather information, and calculates the total terrain radar return, including backscattering and attenuation due to weather. A target buffer receives the aspect and reflectivity information of targets from a target generator. This data is inserted to the terrain data at the appropriate range positions. The radar returns at the range bins are then sorted and integrated across the azimuth beam-width before outputting to a display device.

The hardware design may be characterized as a modular approach with each of the four channels having its own microprocessor as a controller. A key feature of the invention is the manner in which the four channels are integrated to produce the desired output. This integration requires coordination of timing of the several channels, and to this end, one of the channel microprocessors is designated the master microprocessor to provide this coordination. A result of this approach is that the DRLMS hardware has been greatly reduced, and image fidelity has been increased.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
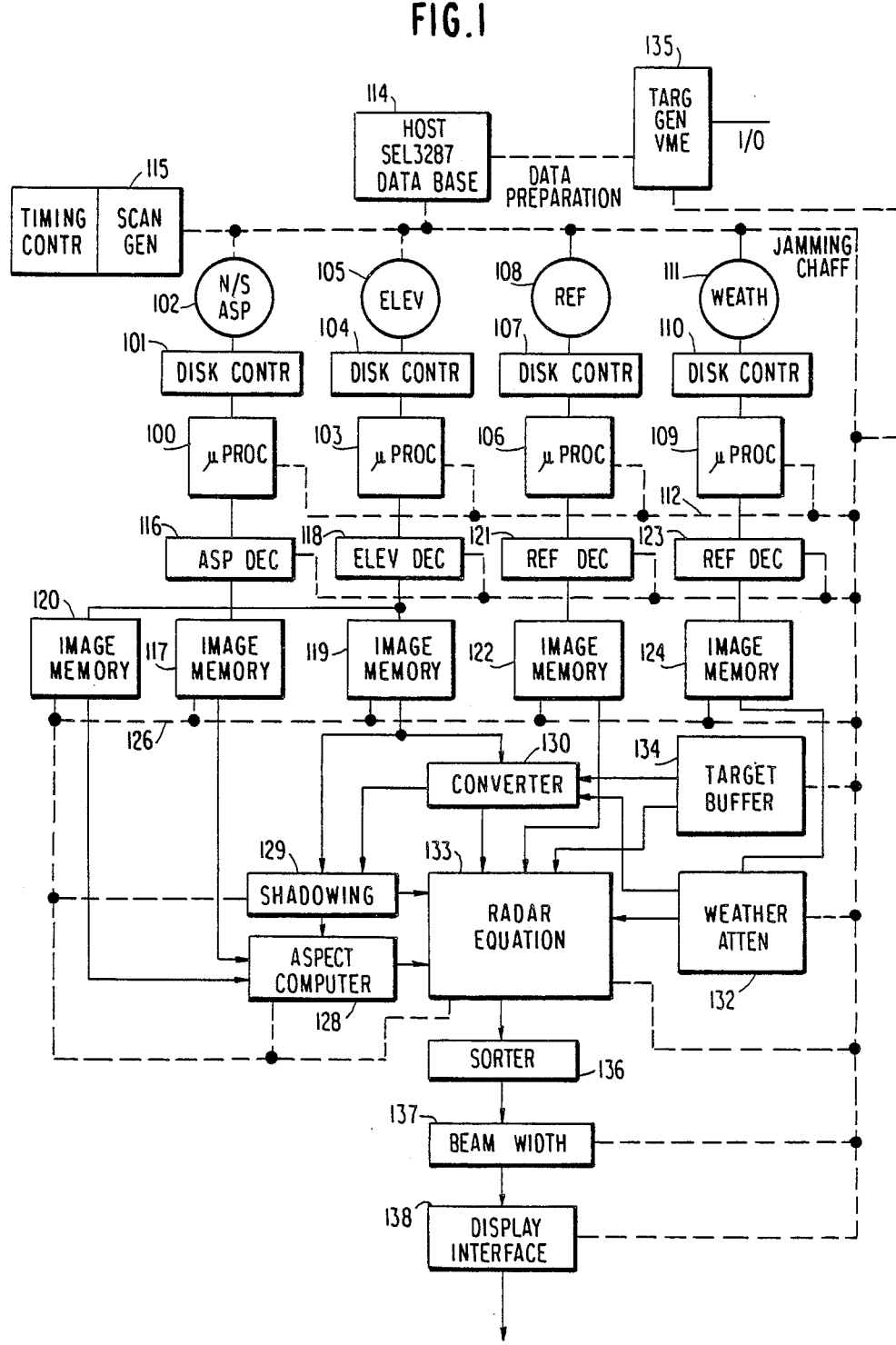
FIG. 1 is a block diagram of the data retrieval system and the data decompressor system in the DRLMS architecture according to the invention.

Referring now to the drawings, and more particularly to FIG. 1, the DRLMS data retrieval and data decompression system according to the invention is shown in block diagram form. The system is characterized by a modular design and is composed of four channels; namely, a north/south aspect channel, an elevation channel, a reflectivity or culture channel, and a weather channel. Each channel includes a microprocessor which serves as a controller for the channel. More specifically, the north/south aspect channel includes microprocessor 100 connected via a disk controller 101 to a direct access storage device (DASD) 102 which is typically a hard or so-called Winchester disk drive. The elevation channel includes microprocessor 103 connected via a disk controller 104 to a DASD 105. The reflectivity channel includes microprocessor 106 connected via a disk controller 107 to a DASD 108. The weather channel includes microprocessor 109 connected via a disk controller 110 to a DASD 111. The microprocessors 100, 103, 106, and 109 may be, for example, Intel 8086 microprocessors. These are, in turn, supported by read only memory (ROM) containing Basic Input/Output System (BIOS), Operating System (OS) and program code, as well as local random access memory (RAM) and other supporting buffer registers and input/output (I/O) integrated circuits (IC), which form no part of the present invention. Further, the microprocessors 100, 103, 106, and 109 are connected to a common bus 112, and one of the microprocessors, the reflectivity microprocessor 106, acts as the master controller.

Data for each channel is compressed and stored on a host computer system 114. The host 114 may be, for example, a Gould 3287 general purpose computer with tape drives. This computer was selected for its speed, although other general purpose computers could be used. The data is compressed off line using different compression algorithms by the host 114 for each channel and stored on a corresponding one of the DASDs 102, 105, 108, and 111. Further, each channel shares common timing control and scan generator circuitry 115 to maintain synchronism of the four channels. The host 114 may be directly connected via a communications link to the DASDs 102, 105, 108, and 111, as indicated by the dotted line, or the compressed data generated by the host 114 may be supplied to the DASDs 102, 105, 108, and 111 via a floppy diskette or some other suitable medium.

The reflectivity channel data is compressed using run length coding; that is, a run of binary zeros coded as a binary number which is stored. Run length coding is commonly used for image encoding and a general explanation of this type of coding may be had with reference to the book by Richard H. Hamming entitled *Coding and Information Theory*, published by Prentice-Hall (1980). The elevation channel data is compressed using a differential coding technique; that is, "keys" representing the differences in elevation in preceding elevations are coded and stored. These "keys" are correlated with coordinates in the gaming area. Decompression is therefore a matter of reading out the stored "keys" and accumulating the differences starting from a reference elevation at a beginning scan position. The aspect channel data is compressed using a combination of run length and differential coding techniques. Decompression in this channel is a hybrid of the techniques employed in the reflectivity and elevation channels.

In the data retrieval process, data in DASDs 102, 105, 108, and 111 are read out under the control of respective microprocessors 100, 103, 106, and 109. Since the data read from the DASDs is compressed, it must first be decompressed before it can be used in the simulation process. For this purpose, each channel is provided with a dedicated decompressor and image memory to first decompress and then to temporarily store the reconstructed data. Thus, the north/south aspect channel includes a decompressor 116, illustrated in FIG. 8, and a north/south aspect image memory 117. The elevation channel includes a decompressor 118, illustrated in FIG. 7, and an elevation memory 119. In addition, east/west aspect data is reconstructed from elevation data and stored in east/west aspect image memory 120 from the decompressor 118. The reflectivity channel includes a decompressor 121, illustrated in FIG. 3, and a reflectivity image memory 122. And the weather channel includes a decompressor 123 and a weather image memory 124. The image memories 117, 119, 120, 122, and 124 are sometimes referred to as "ping-pong" memories for the reason that each may be considered as two separate memories which allow data to be written into one while data is read out of the other with the roles reversed for the next read/write memory cycle. This technique of memory management is conventional in real time systems.

The completion of the process of loading decompressed data into a respective one of the image memories is indicated to the corresponding microprocessor by the setting of a flag by the decompressor for that channel. The reflectivity microprocessor 106 not only checks the flag of completion for its own channel decompression process, it also checks the other channels though the common bus 112 to see that all the decompression processes have been completed. When all the decompression processes have been completed, the reflectivity microprocessor 106 sends a signal on memory bus 125 to all the image memories to flip their "ping-pong" memories. A similar signal is sent on common bus 112 to the other microprocessors 100, 103 and 109 to indicate the beginning of the next cycle of the data retrieval and reconstruction process. Readout of the data in image memories 117, 119, 120, 122, and 124 is controlled by the timing control and scan generator 115 over the common address bus 126.

Figure 10:
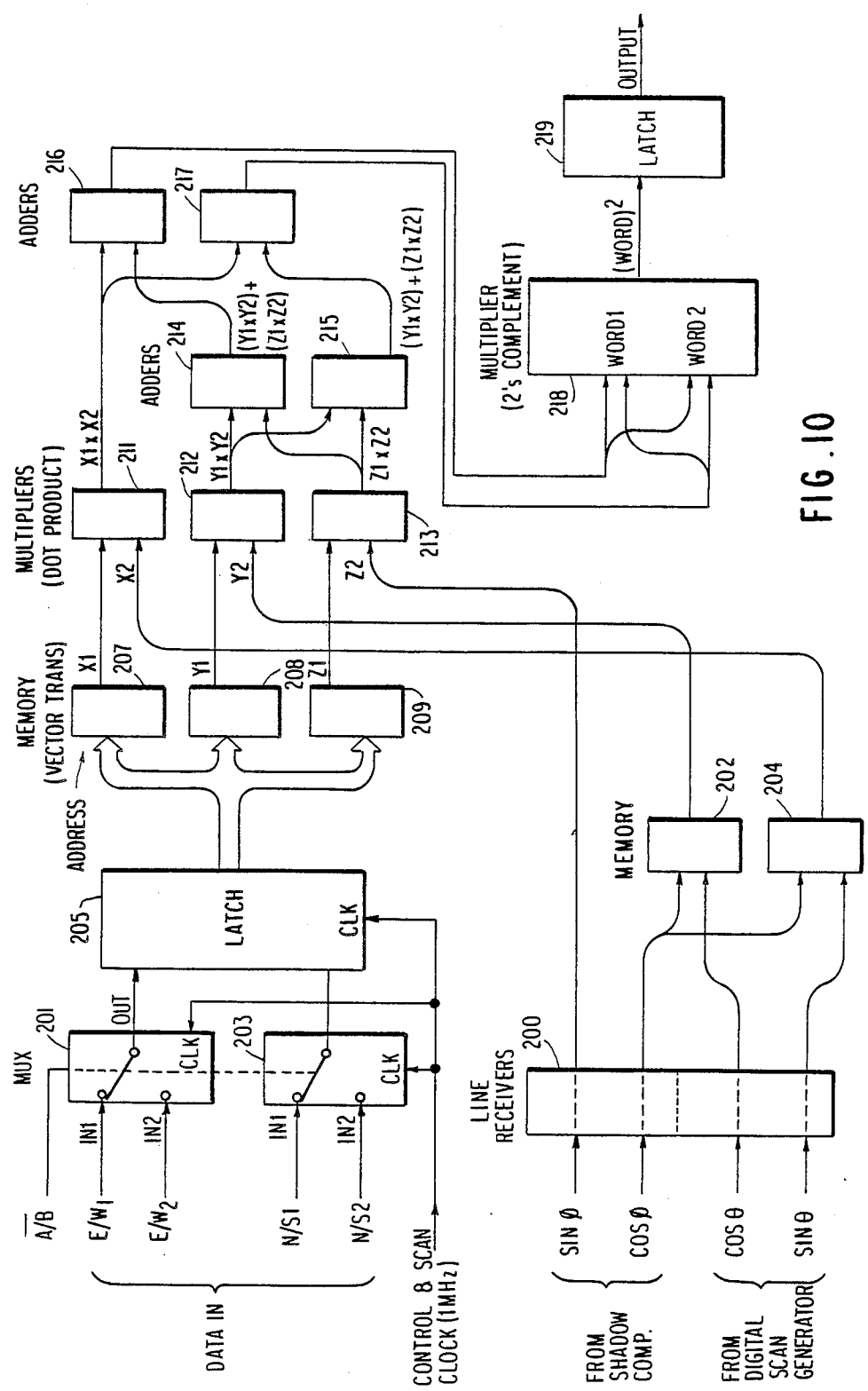
FIG. 10 is a block diagram of the aspect computer used in the DRLMS according to the invention.

An aspect computer 128, illustrated in FIG. 10, receives north/south aspect data from image memory 117 and east/west aspect data from image memory 120 and processes this data to produce the surface normals. It then calculates the vector dot products between the radar incident vectors and the surface normals to generate the aspect radar returns.

Figure 11A:
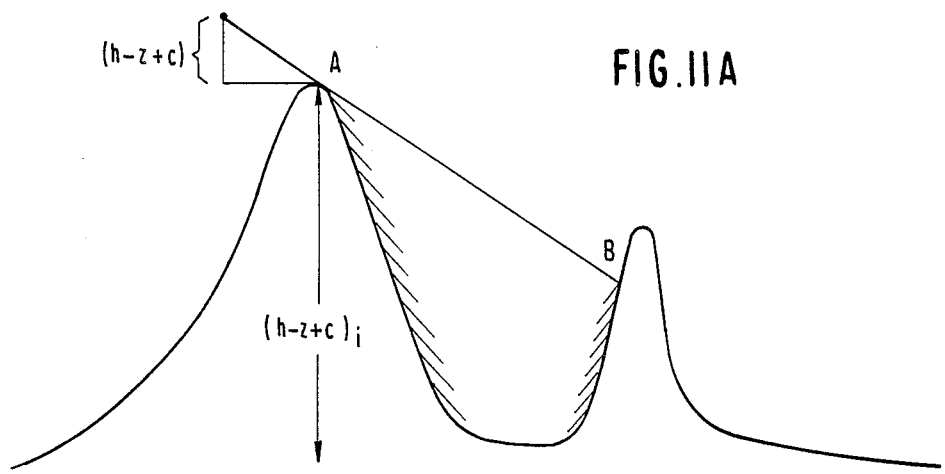
FIG. 11A is a side view illustration showing shading by a hill in the terrain.
Figure 11:
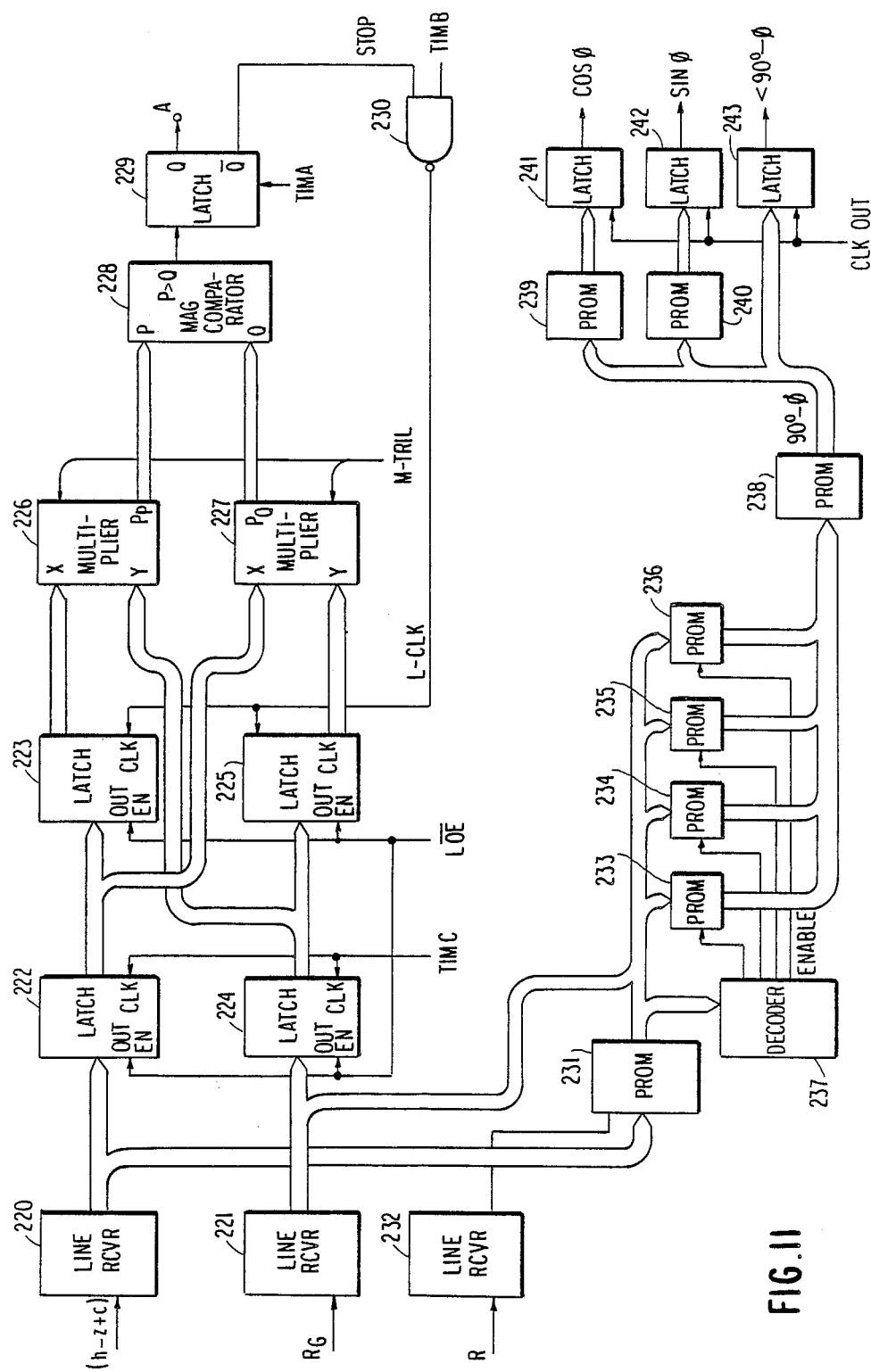
FIG. 11 is a block diagram of the shadowing hardware used in the DRLMS according to the invention.

The data from the elevation image memory 119 is output to the shadowing hardware 129, illustrated in FIG. 11, which calculates shadowing due to terrain. Converter hardware 130, illustrated FIG. 12, also receives data from image memory 119 and calculates the slant range from the ground range and terrain elevation. A weather attenuation hardware 132 retrieves a weather map from the weather image memory 124 and calculates the attenuation due to the weather.

Figure 14:
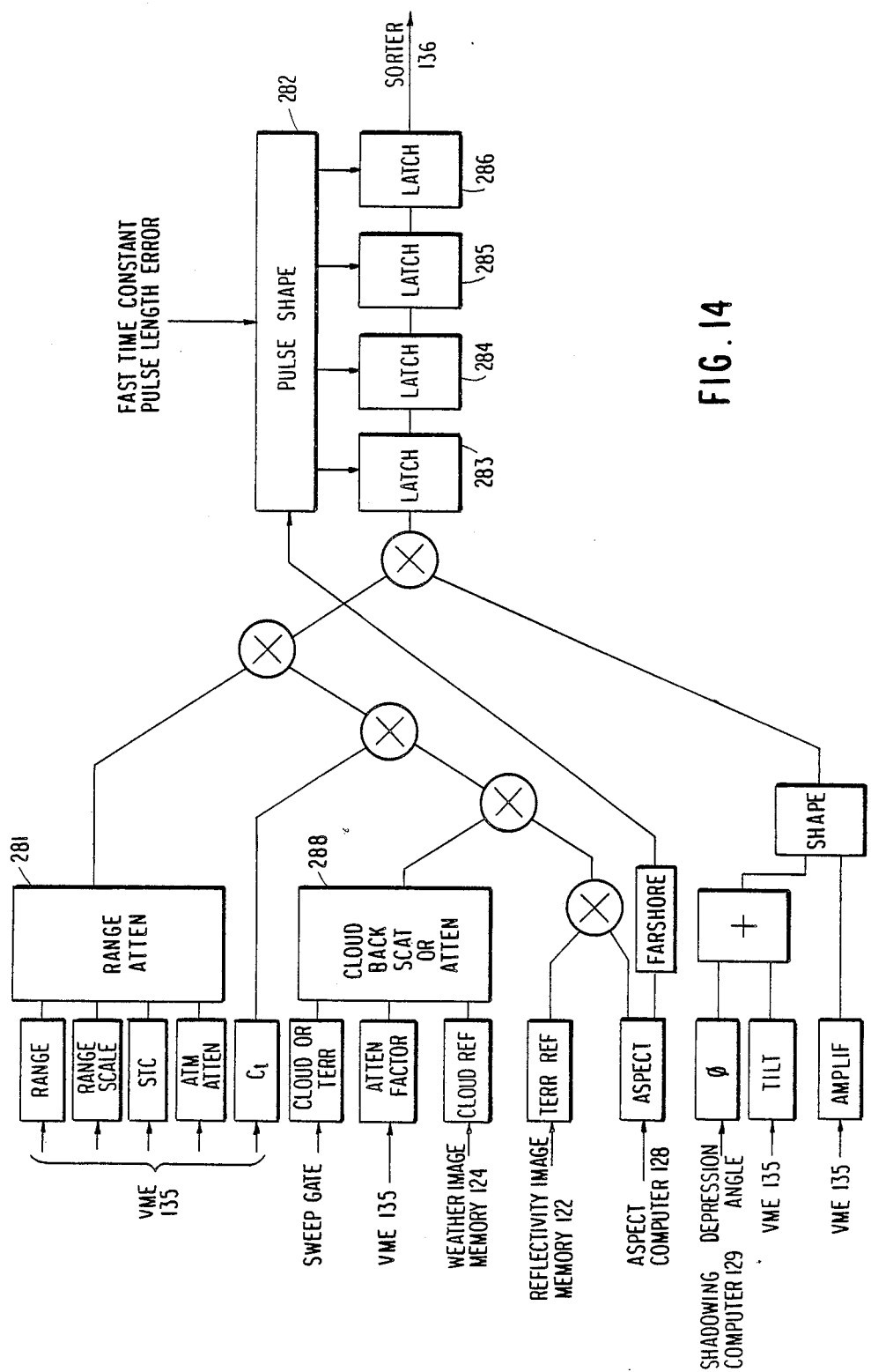
FIG. 14 is a block diagram of the radar equation hardware used in the DRLMS according to the invention.

Radar equation hardware 133, illustrated in FIG. 14, receives reflectivity information from image memory 122, along with the calculated aspect from aspect computer 128, shadowing from shadowing hardware 129, and weather attenuation from weather hardware 132, and calculates the total radar return, including the backscattering and the attenuation due to weather. A target buffer 134 receives the aspect and reflectivity information of targets from a target generator 135. The target generator is a microprocessor based system using, for example, the Motorola 68020 microprocessor and VME bus. This data is inserted to the terrain data at the appropriate range positions. The radar returns at the range bins are then sorted by a sorter 136 and integrated across the azimuth beam-width by a beam-width integrator 137 before outputting to a cathode ray tube (CRT) display through a display interface 138. If the display is a raster display, then a scan converter (not shown) would be required in place of the display interface 138.

In this system, the ownship position, range scale information, and so forth are input to the reflectivity microprocessor 106 from target generator 135. Microprocessor 106 then distributes the information to the other microprocessors 100, 103 and 109 via the common bus 112. For each channel, the microprocessor retrieves the relevant tiles of compressed data to a buffer in the corresponding microprocessor. The dedicated decompressor hardware for each channel processes the compressed data of a tile and regenerates the gridded data for that tile.

Figure 2:
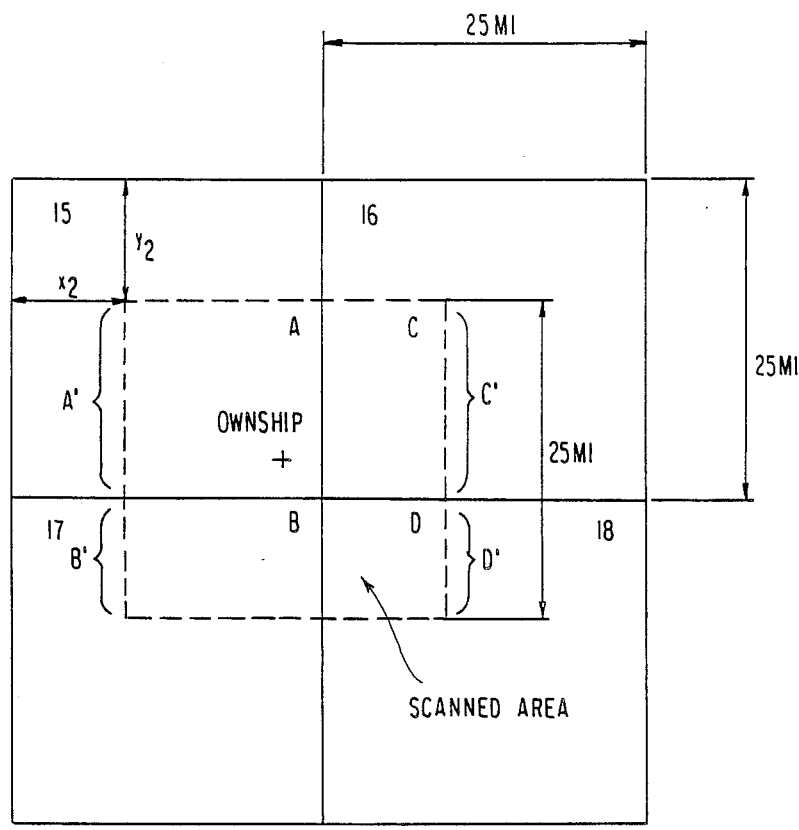
FIG. 2 is a pictorial diagram illustrating the processing of the tiles in the DRLMS data retrieval system.

There are in general four relevant tiles surrounding ownship position as shown in FIG. 2. Portions of the four tiles are selected by a microprocessor to generate a composite tile surrounding ownship position. This composite tile. is then loaded into an image memory for radar processing. To understand the data retrieval operation of the system, consider the situation where the range scale is 25 nm. Given the ownship's position in the gaming area, the microcomputer computes which four (in the general case) images properly contain a $50 \times 50$ square mile area centered about the ownship's position. In FIG. 2, the region is shown lying in parts of image areas numbered 15, 16, 17, and 18. The microprocessor then accesses the disk memory and decomposes that portion of image 15 designated by region A and transfers the resulting pixel data to the corresponding region in the image memory. Then image 16 is accessed, and the portion of the dotted box labeled region C is transferred to the memory. Similarly, regions B and D are obtained from images 17 and 18 to construct the entire image centered about ownship position.

The reflectivity data is run length compressed with four bits of reflectivity. If the run lengths are greater than 256, more words are needed for repetition. The compressed data tiles of $1024 \times 1024$ pixels are stored in blocks of data in the DASDs for each channel. Each microprocessor retrieves the compressed data from its DASD and transfers it to the decompressor registers which decode the compressed data words. For the reflectivity or culture channel, this is done in terms of reflectivity values and run lengths. Reflectivity decompressor 121 then reconstructs the reflectivity value per pixel by repeating the same reflectivity for the number of pixels equal to the associated run length.

Figure 3:
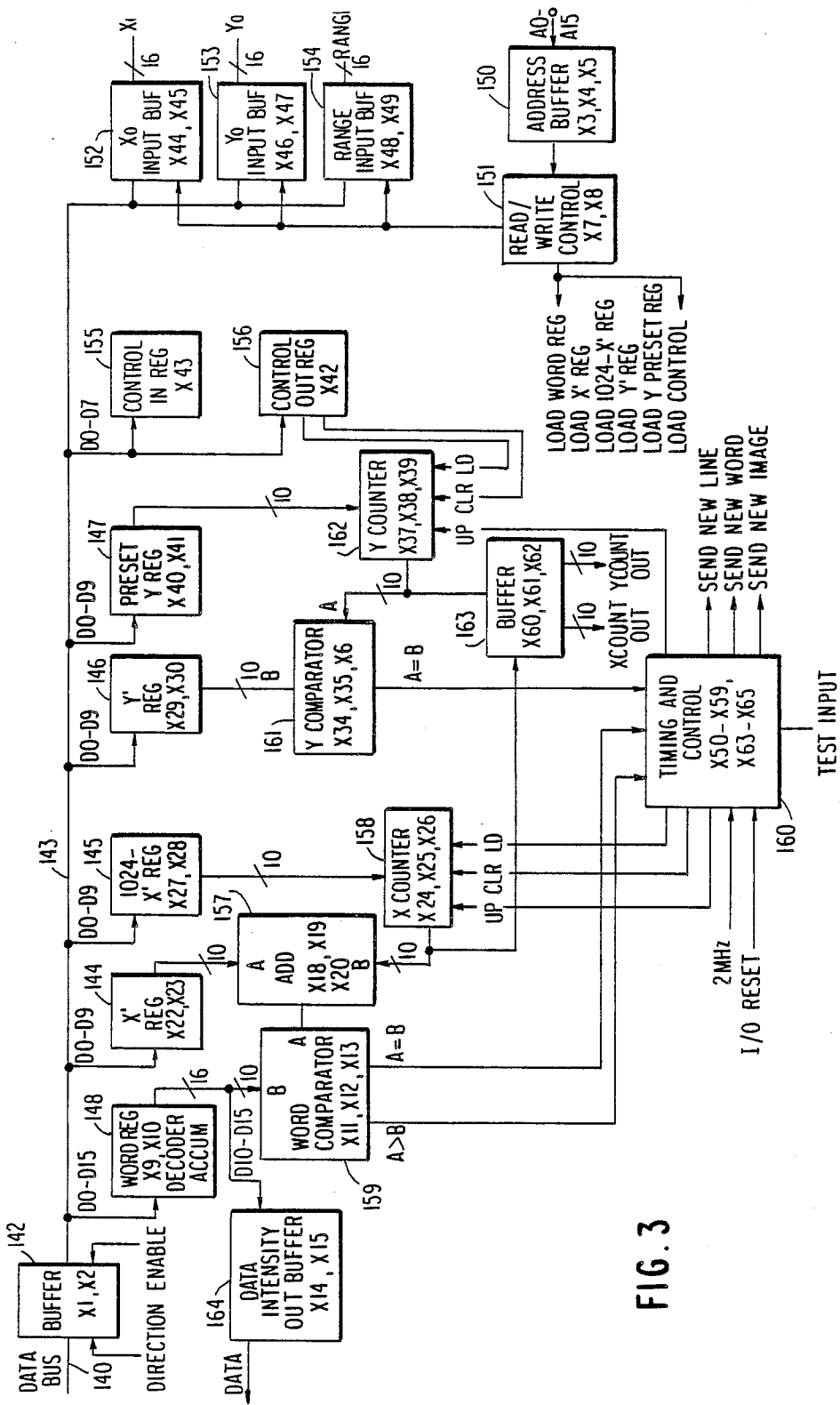
FIG. 3 is a block diagram of the hardware of the dedicated reflectivity decompressor in the reflectivity channel of the DRLMS architecture shown in FIG. 1.

FIG. 3 shows the reflectivity decompressor 121 hardware block diagram. The 16-bit data bus 140 is connected between the microprocessor 106 and a bi-directional buffer 142. Buffer 142 is connected via a bus 143 to an X' register 144, a 1024-X' register 145, a Y' register 146, and a preset Y register 147. In addition, buffer 142 is connected via bus 143 to a word register 148, this register being an accumulating decoder for decoding the run length coded reflectivity data. Each of these registers are controlled to load coordinate data and a data word of reflectivity by the 16-bit microprocessor address buffer 150 and the read/write control 151. Ownship position coordinate data and range data are input to $X_0$ input buffer 152, $Y_0$ input buffer 153 and range input buffer 154, also controlled by address buffer 150 and read/write control 151. These buffers are also connected to bus 143. Additionally, control in register 155 and control out register 156 are connected to bus 143.

The X' register 144 is connected to one input of adder 157. The output of 1024-X register is connected to preset X counter 158, the output of which is the second input to adder 157. The output of adder 157 is supplied to one input to word comparator 159, the other input of which is supplied by the word register decoder accumulator 148. Word comparator 159 provides two outputs, denoted $A > B$ and $A = B$, which are supplied to timing and control circuitry 160. The output of the Y' register 146 is supplied as one input to a Y comparator 161, the output of which is also supplied to timing and control circuitry 160. The output of preset Y register 147 is connected to preset Y counter 162, the output of which is supplied as the second input to Y comparator 161. Both the X counter 158 and the Y counter 162 count in response to clock pulses supplied by the timing and control circuitry 160, and their respective counts are temporarily stored in buffer 163. The output of the reflectivity decompressor 121 is provided by the data intensity out buffer 164 which is loaded from the output of the word register decoder accumulator 148.

There are two data formats for the run length which can either be the 4-bit short form of less than 16, or 8-bit long form of more than 16 but less than 256 long. In the short form, one 16-bit data word can contain run lengths, each of four bits reflectivity value and four bits run length for the two half words. In the long form, the data word can represent only one long run length with the upper four bits of the data word representing the reflectivity value. The data words are sent consecutively by the send-new-word command from the timing and control circuitry 160, after the run length decoding associated with each word is completed. The reflectivity value is sent over the data intensity out buffer 164 to the image memory 122 as the reconstructed reflectivity per pixel. At each update, knowing ownship position, the microprocessor 106 calculates the relative coordinates between the data tiles and the image tile to be displayed and sets up the four registers on the reflectivity decompressor, namely, the X' register 144 and 1024-X' register 145, the Y' register 146 and the preset Y register 147. These registers are controlled by microprocessor 106 through the read/write control register 151. The presets of these registers are dependent upon ownship position vis-a-vis the data tiles.

In FIG. 2, the image memory 122 is filled from the left to right boundary of image tile 15. A new line signal is issued by the timing and control circuitry 160 for generating a new scan line. This process is repeated for the subsequent scan lines until the upper left portion of the image memory 122 is filled. Similarly, the other three portions of the image memory 122 are filled with different set-ups of the registers on the reflectivity decompressor. X2 is the horizontal displacement of the image tile and the data tiles 15 and 17. Y2 is the vertical displacement of the image memory with tiles 17 and 18.

The origin for X and Y is the upper left corner of the tile. For example, in the decompression of data tile 15 to fill the upper left corner portion of the image memory 122, the starting of decompression would be at Y=Y2 in tile 15. In the reflectivity DASD 108, where a block of compressed data of image 15 resides, starting from line Y=Y2, the compressed data is sent to the decompressor 121 to be decompressed. In the reflectivity decompressor 121, the startup of decompression for image region A, for the first scan line, the preset Y register 147 will be loaded with a zero value to preset Y counter 162, which is incremented every scan line. The Y' register 146 is loaded with the 1024−Y2 value. When the Y counter 162 counts to 1024−Y2 value, and A=B as detected by Y comparator 161, a new image is requested by the timing and control circuitry 160. To send a new line of data for image region A, register 145 is loaded with X=0 and register 144 is loaded with X2 data. For each scan line, data tile 15 starts decompression at X=0. Once the decompression reaches X=X2, the decompressed image 15 data starts to load into 1 image A, until X reaches 1024−X2, which is the edge boundary between tiles 15 and 16.

The A and B inputs of adder 157 are added to equal (X2+1024−X2)=1024, which is an input to the word comparator 159. When the sum equals 1024, the timing and control circuitry 160 will issue a send new line to increment the Y counter 162. The word register 148 receives the reflectivity value (4 bits) and passes this value on to the data intensity out buffer 164. The run lengths are accumulated before outputting to the word comparator 159. When A is greater than B, the Y counter 162 stops counting and a new word is requested by the timing and control circuitry 160.

Figure 4:
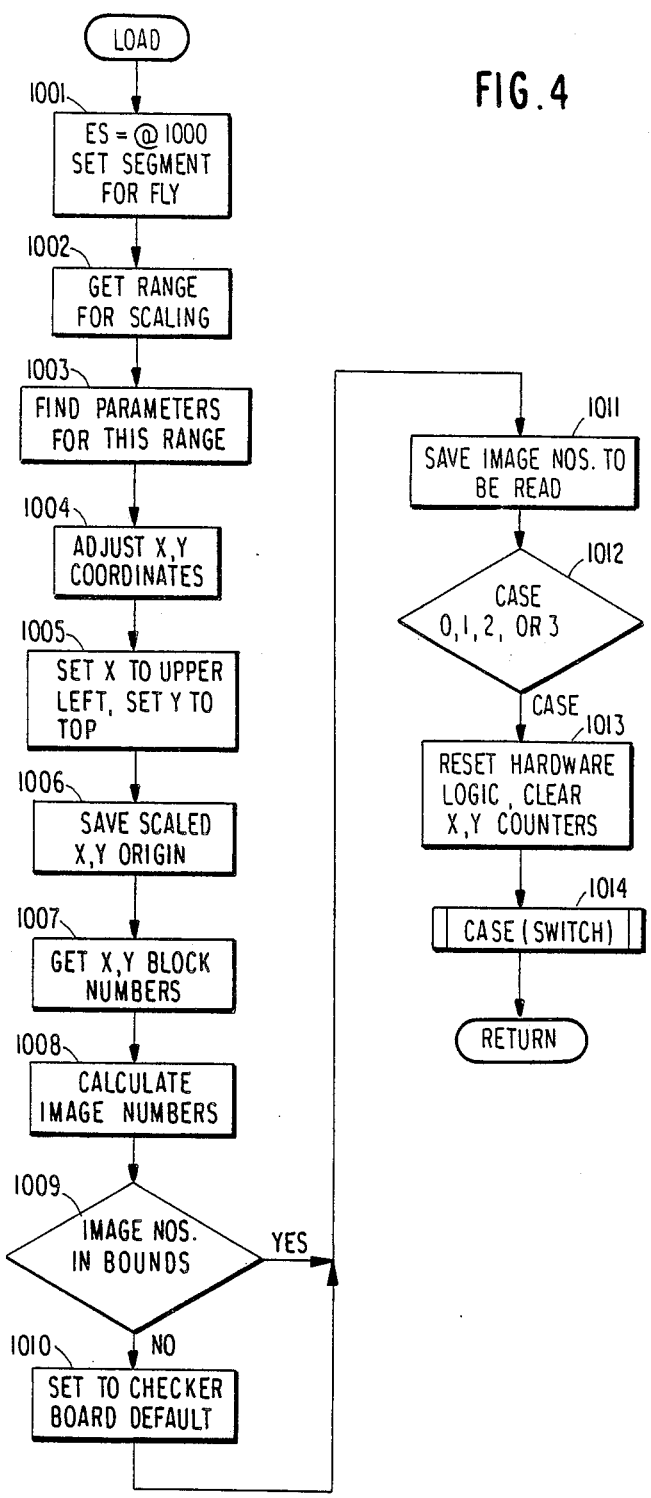
FIGS. 4, 5 and 6, taken together are flow diagrams of the reflectivity channel data access software.

FIG. 4 is a flow diagram showing the logic of the reflectivity channel data access and reconstruction process. The inputs are the range and the X,Y coordinates of ownship position in the gaming area. The load process begins at function block 1001 by setting the ES register in the 8086 microprocessor to 1000. This sets the segment for the FLY routine. Next, in function block 1002, the range input is retrieved for scaling. Using the retrieved range, a range table is addressed in function block 1003 to find the parameters for this range. An offset of eighty bytes is added to the parameters from the range table. Then, in function block 1004, the X,Y coordinates of ownship position are adjusted for present range scaling, if necessary. The X position is set to the upper left corner of a 512 byte image block, and the Y position is set to the top of the image block, as indicated by function block 1005. The scaled X,Y position is saved in function block 1006, and then the X,Y block numbers are retrieved in function block 1007. The system accomplishes this by finding the composite block number of the upper left corner of the image block. Using the block numbers, the image numbers of regions A, B, C, and D illustrated in FIG. 2 are calculated in function block 1008, and these image numbers are saved. A check is then made in decision block 1009 to determine if the calculated image numbers are within the bounds of the gaming area. If not, the image numbers are set in function block 1010 to checkerboard constant default values before control procedes to function block 1011. On the other hand, if the calculated image numbers are within the bounds of the gaming area, control goes directly to function block 1011 where the image numbers are saved to be read. In decision block 1012, a determination is made as to which of four cases is present. These cases are, with reference to FIG. 2, case 0, only one image needed, case 1, two images are needed, one above the other, case 2, two images are needed, one beside the other, and case 3, all four images are needed. Case 3 is, of course, the most general and is specifically illustrated in FIG. 2 by the regions A, B, C, and D in the four tile areas. In function block 1013, the hardware logic is reset and the X and Y counters of the decompressor are cleared. At this point, the case determined in decision block 1012 is executed in operation block 1014 before a return is made.

Figure 5:
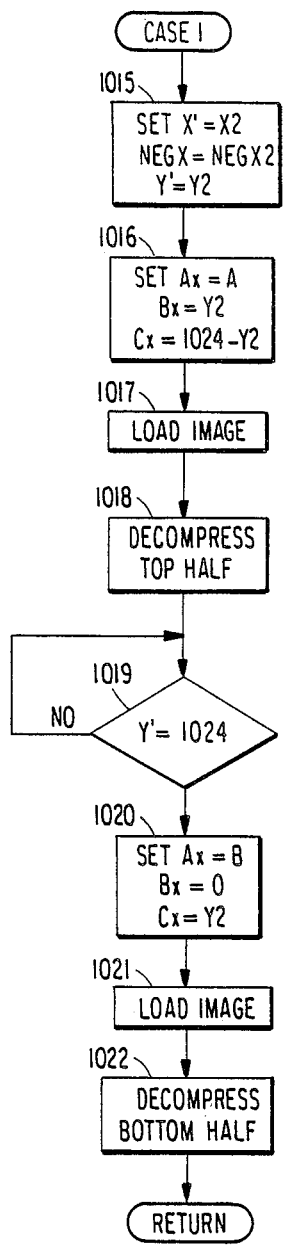

In the following descriptions, the logic of the decompression of cases 1 and 3 are described, cases 0 and 2 being special cases of these. Considering case 1 first, FIG. 5 shows the flow diagram for decompressing top and bottom images, for example, images 15 and 17 shown in FIG. 2. The process begins in function block 1015 where X' is set equal to $X_2$, setting the $X_2$ register, NEG X is set equal to NEG ($X_2$), and Y' is set equal to $Y_2$, setting the 1024−$Y_2$ register. This sets the decompressor registers. Next, in function block 1016, Ax (the image number) is set to A, Bx (the first line to load) is set to $Y_2$, and Cx (the number of lines to load) is set to 1024−$Y_2$. This sets registers to load compressed image data from disk. In function block 1017, the compressed image is loaded from disk to the microprocessor memory. The top half of the image is decompressed in function block 1018. During this process, the count in the Y counter is tested in decision block 1019 to determine if the count has reached 1024. When that count is reached, Ax (the bottom image number) is set to B, Bx (the first line to load) is set to zero, and Cx (the number of lines to load) is set to $Y_2$ in function block 1020. This sets registers to load compressed image data from disk to the microprocessor memory, in function block 1021. Then, the bottom half of the image is decompressed in function block 1022.

Figure 6:
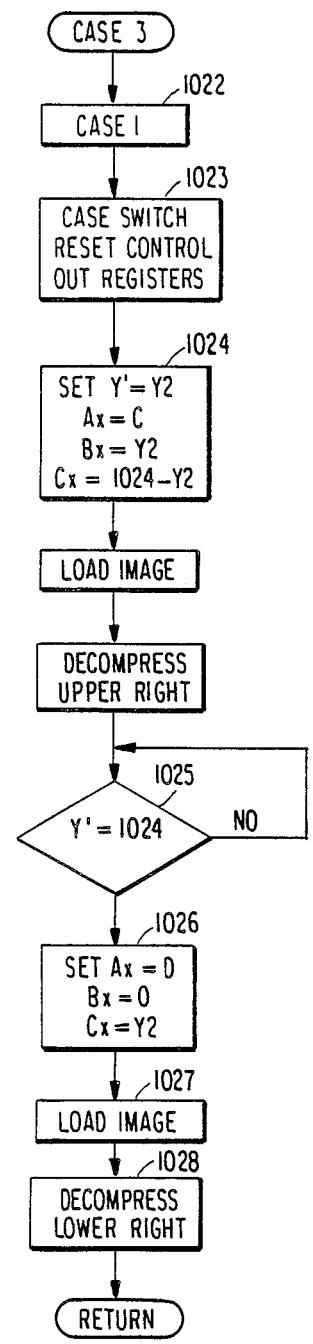

FIG. 6 shows the flow diagram for decompressing four images; i.e., case 3. The first part of this process is a repeat of case 1 which is indicated by function block 1022. Then a case switch is made in function block 1023 to reset control out registers for right top and bottom images. This is done by setting the X' and 1024−X' registers. In function block 1024, Y' is set to $Y_2$ and the 1024−Y' register is reset. Then Ax (the top right image number) is set to C, Bx (the first line to load) is set to $Y_2$, and Cx (the number of lines to load) is set to 1024−$Y_2$. This sets the registers for data retrieval from disk. The Y counter continues to count until Y' equals 1024, as determined in decision block 1025. At this point, Ax (the image number of the lower right region) is set to D, Bx (the first line to load) is set to zero, and Cx (the number of lines to load) is set to $Y_2$ in function block 1026. This sets the registers for data retrieval from disk. The image data is loaded in function block 1027, and the lower right image is decompressed in function block 1028.

There are two phases to the generation of compressed elevation data. First, a key must be formed. Then, each image must be compressed using the information in the key. Central to both phases is the process of searching through the key to find a close match for a sequence of sixteen elevations obtained from an image file. A sequence, $<T(i): 1 \leq j \leq 16>$, of relative elevations obtained from a line record $<h(j): 0 \leq j \leq 1025>$ of terrain elevations by $T(i)=h(N+i)-h(N)$, where N, divisible by 16, is called a data trajectory. Practical considerations dictate that, for each data trajectory, the search be limited by including only those key trajectories which match the endpoint rise exactly, so that T(16)=S(16).

When the key is being built, the trajectories from three representative images are first sorted into data batches of uniform end point rise. To construct the initial keys for an end point rise category, the trajectories are collected, sorted and condensed form these three images. The trajectories of subsequent images for compression are compared to these keys to find the best matches. If no match is found within a certain error radius for a trajectory, it is added to the key file as a new key. The error radius chosen is a distance in 16-dimensional Euclidean space corresponding to a sixteen pixel trajectory. As the compression process proceeds, the key file continues to grow. Consequently, the number of key trajectories in each batch is proportional to the number of data trajectories in the batch. The target number of key trajectories is set to be proportional to the number of data trajectories in the batch. Thus, the key trajectories gradually grow as the data batch is scanned. After the entire batch has been scanned, the size of the key batch is compared with the target size. If the size is not acceptable, the key buffer is erased, the radius is set to a new value, and the key building is repeated at the new radius. This continues until an acceptable sized key batch is generated. Finally, the key batch is stored on the disk and the key builder proceeds to the next batch. After the key has been built, 16-bit address pointers are assigned to each key trajectory.

When the key is ready, each of the elevation images is compressed. During compression, the key is also searched to find, for each data trajectory, a close key trajectory. The compressor program halts the search if an exact match (distance=0) is found. Otherwise, it searches the entire key batch and uses a trajectory which is at minimal distance to represent the datum. Compressed data are stored in one file and compressed-expanded elevations are stored in another file.

Similar to reflectivity decompression, the compressed elevation data is retrieved from the microprocessor memory and put on the data bus, from which the elevation decompressor retrieves, decompresses and loads the resultant data to the image memory of 1024×1024 pixels. Each pixel has a format of twelve bits, where the last bit represents a ten foot elevation spacing.

Figure 7:
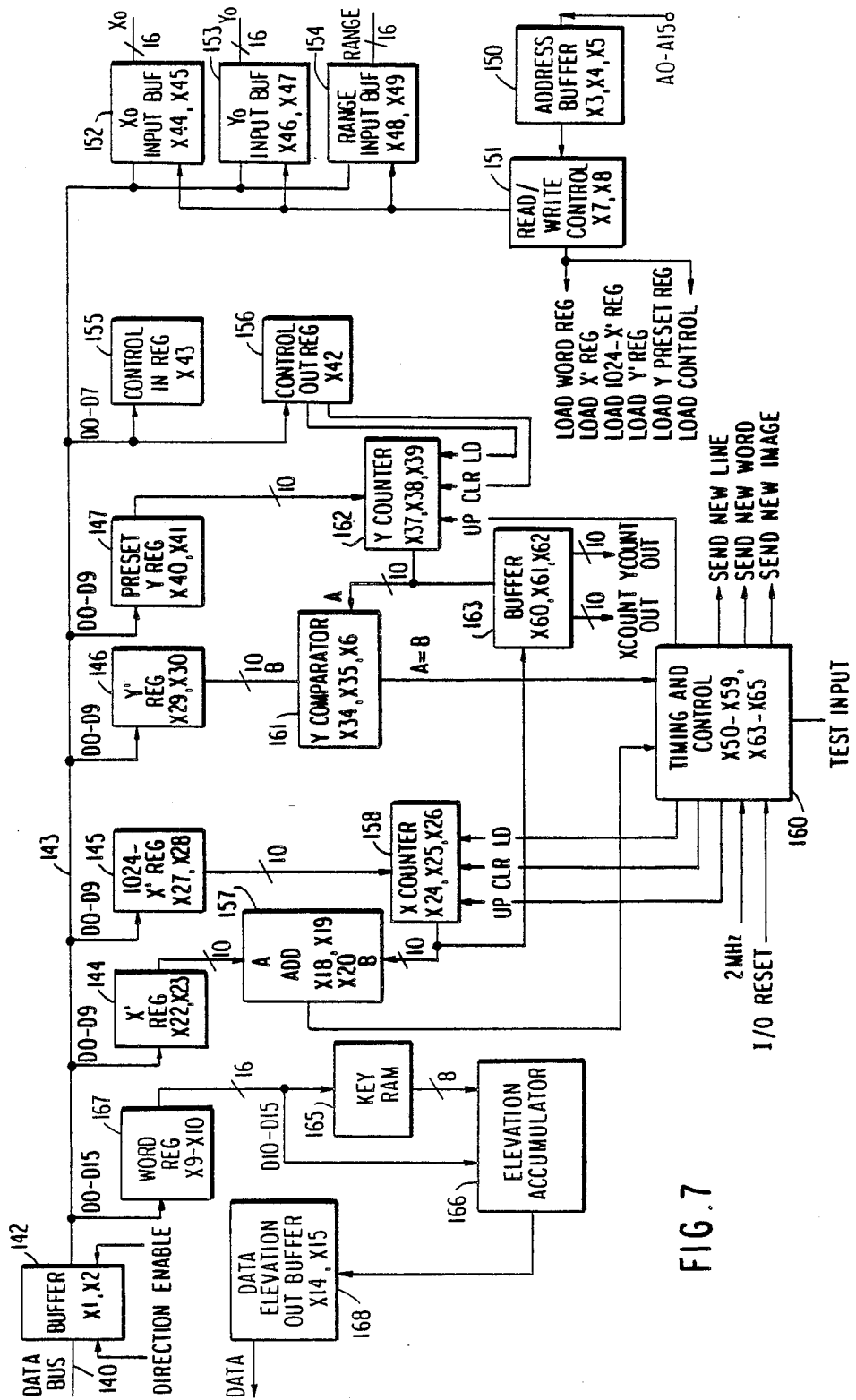
FIG. 7 is a block diagram of the hardware of the dedicated elevation decompressor in the elevation channel of the DRLMS architecture shown in FIG. 1.
Figure 8:
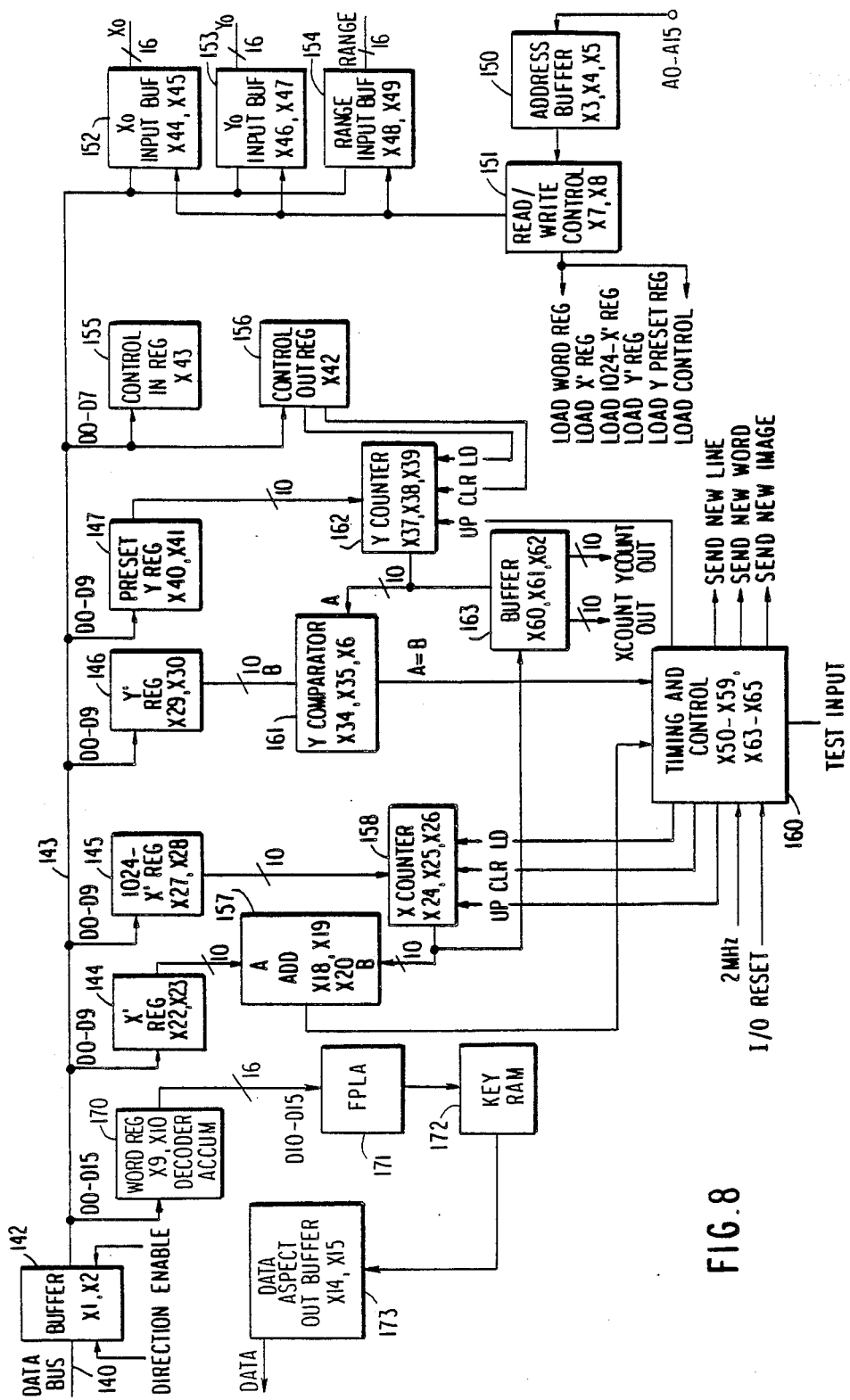
FIG. 8 is a block diagram of the hardware of the aspect decompressor in the aspect channel of the DRLMS architecture shown in FIG. 1.

The elevation decompressor 118 is shown in FIG. 7 and is generally similar to the reflectivity decompressor 121. In FIG. 7, like reference numerals designate similar components as in FIG. 3. The principle differences between the reflectivity decompressor 121 and the elevation decompressor 118 are the Key RAM 165 and elevation accumulator 166. The Key RAM 165 is addressed from a word register 167 which, unlike word register 148, is not a decoder accumulator since run length coding is not used for the compressed elevation data. The initial value, that is the base elevation, is loaded in elevation accumulator 166 from word register 167, and the accumulated elevation values are output to the data elevation out buffer 168. Also, the output of adder 157 is supplied to timing and control circuitry 160.

The compressed elevation data are expanded one line record at a time, where a line is a row of 1024 elevation points running from West to East across an image tile. Each line record of compressed data is sixty-five 16-bit words. The first word of a line record has four leading one's and is followed by the 12-bit elevation of the first grid point. From each of the remaining 16-bit words, the hardware recovers a sequence of sixteen elevations by using the Key RAM 165. The byte found at this location and the subsequent fifteen bytes are used as elevation differences between adjacent pixels. By integrating them in elevation accumulator 166, the hardware generates the next sixteen elevations. Note that, because elevations are determined by integration from West to East across the image square, the hardware must process the entire line record even though only the last sixteen elevations will be loaded into the elevation image memory 119. Although the sixty-five words of compressed data contain information sufficient for the expansion hardware to generate 1025 elevations, the 1025th elevation is discarded since it belongs to the next image file to the East.

The heart of the elevation decompressor is the 512K byte Key RAM 165 and the 12-bit hardware accumulator 166. The Key RAM 165 is a large storage area that holds samples of terrain trajectories. These trajectories are sequences of sixteen elevation differences each. By starting with an absolute elevation and adding one after another, the elevation differences from a trajectory to it, a sequence of sixteen decompressed elevation values is generated by the hardware accumulator.

The aspect compression utilizes a combination of the techniques of run length compression as in the reflectivity channel and the table lookup technique as in the elevation channel. First, an aspect image tile needs to be derived from an elevation image tile. The elevation data from two consecutive scan lines are stored and processed to obtain the elevation gradients or the north/south aspects between two scan lines at every pixel. In this manner, continuing the processing of the image from the top down and scan line after scan line, a 1024×1024 north/south aspect image is constructed from an elevation tile, ready for compression.

In the aspect compression, the 10-bit run length format allows for the maximum run extension to cover the entire scan line of 1024 pixels. The combination of 10-bit run length and 6-bits aspect constitutes a 16-bit word. For the entire 1024×1024 aspect image, an ensemble of these words are sorted and a distribution is taken. The next step is to assign the keys to this ensemble for addressing and identification of these words in the following manner. The most commonly occurring words are assigned to 4-bit key values and the least commonly occurring words are assigned 16-bit values. In between are the eight bits and twelve bits assigned to the occurring events of intermediate frequency. Hence, a table of data words of 10-bit run length and 6-bit aspect can be addressed by the keys of variable lengths of four bits, eight bits, twelve bits, and sixteen bits.

The aspect decompressor is shown in FIG. 8 and, again, is similar in construction to that of the reflectivity decompressor of FIG. 3. As before, like reference numerals designate similar components. The hardware design adopted is a hybrid system between the reflectivity and the elevation decompressors; it has the features of both run length compression and table lookup for compression. Thus, the word register 170 is a decoder accumulator like word register 148 in the reflectivity decompressor. However, the output of the word register 170 is supplied to a field programmable logic array (FPLA) 171 which generates addresses to a Key RAM 172.

Each compressed aspect image data are retrieved from the disk and loaded to the memory of the microprocessor 103 in real time. The FPLA 171, Key RAM 172 system unique to this channel is used to decode the compressed aspect data word retrieved from the microprocessor memory. The FPLA 171 decodes the data words into the 4-bit, 8-bit, 12-bit, and 16-bit formats and generates the addresses for the Key RAM 172. After the Key RAM 172 is addressed, the 16-bit words of 10-bit run length and 6-bit aspect are output from the Key RAM 172. The output of the Key RAM 172 is input to the data aspect out buffer 173. The rest of the hardware in generating the aspects per pixel is similar to the reflectivity decompressor 121.

The compression technique for the weather channel is identical to that of the reflectivity channel. The data base is generated by digitizing weather maps or is created synthetically. The advantage of using a map approach to weather simulation is that it is flexible to allow simulation of weather maps of any irregular shape. However, weather maps can only give a two-dimensional weather return. Hence, the weather attenuation circuit 132 shown in FIG. 1 is added and some additional weather processing is required in the radar equation module 133 to simulate the returns of three-dimensional weather effects.

Figure 9:
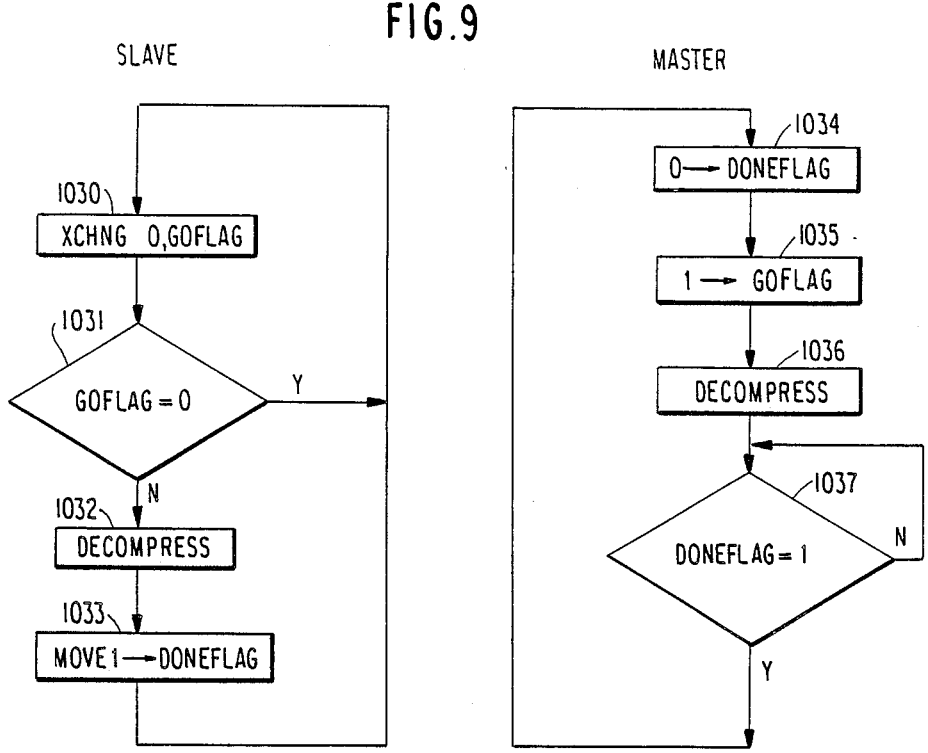
FIG. 9 is a flow chart of the interactions between the microprocessors during data decompression.

For synchronization of the decompression processes of the several channels, microprocessor 106 of the reflectivity channel is designated as the master and the microprocessors 100, 103 and 109 are the slaves. FIG. 9 shows in flow diagram form the communications between the master and slaves. Each microprocessor has a start flag (GOflag) in its local memory and a stop flag (DONEflag) in the local memory of microprocessor 106. The reason for the locations of these flags will become clear from the following description.

The master microprocessor 106 initializes the other microprocessors to begin the synchronization process. This is indicated by process block 1030. At initialization, the slave microprocessors set their GOflags to "0"; i.e., do not start. The slave microprocessors wait in a loop reading the GOflag until it becomes "1", as indicated by the true outcome of the test in decision block 1031. When the GOflag becomes "1", the GOflag is cleared and the decompression cycle is executed in process block 1032. When the decompression cycle is completed, the microprocessors set their DONEflag in the master's memory and wait for their GOflags to be set again, as indicated in process block 1033.

Because the slave microprocessor sits in a tight loop reading the GOflag, its location is in the slave memory. The master is also in a loop that starts by clearing the DONEflags in process block 1034 and then setting the slaves' GOflags in process block 1035. When the master microprocessor 106 has started all the slave microprocessors, the master microprocessor performs its decompression process in block 1036. It then waits in a tight loop reading the DONEflags for the slaves, as indicated by decision block 1037. When all the DONEflags are equal to "1", the master microprocessor repeats the cycle by setting the GOflags of the slave microprocessors to "1".

The master microprocessor 106 is also responsible for deciding the ownship's location. The location is kept in the master's local memory and the slave microprocessors read it. Once the master microprocessor 106 signals the slave microprocessors to start, they read the master's memory to find the radar location and the range scale. From these variables, the microprocessors calculate the four tiles necessary for an image.

With reference now to FIG. 10, there is shown a block diagram of the aspect computer 128. The east/west aspect and the north/south aspect data from image memories 120 and 117 must be processed before the aspect information can be input to the radar equation module 133 to calculate the radar return. The aspect computer calculates the vector dot products of the terrain surface normals with respect to incident radar.

The 6-bit east/west aspect data and the north/south aspect data are input via multiplexers 201 and 203 and latched in register 205. The multiplexers 201 and 203 are required since the image memories 120 and 117 are ping-pong memories. The output of register 205 is used to address programmable read only memories (PROMs) 207, 208 and 209 in a table lookup operation to generate the unit normal $X_1$, $Y_1$ and $Z_1$ components. These components are multiplied in multipliers 211, 212 and 213 by the incident vector components $X_2$, $Y_2$ and $Z_2$, respectively, and the resulting products are added in adders 214, 215, 216, and 217 to produce the dot product. The output of adder 217 is the most significant bits (MSBs) of the dot product, and the output of adder 216 is the least significant bits (LSBs) of the dot product. The dot product is then squared by multiplying by itself in multiplier 218 and latched in latch 219 for output to the radar equation module 133.

The incident vector components $Z_2$, $Y_2$ and $X_2$ are derived from inputs from the shadow computer 129 and the scan generator 115. More specifically, the inputs from the shadow computer 129 are sin $\phi$ and cos $\phi$, while the inputs from the scan generator 115 are cos $\theta$ and sin $\theta$, each of which are input to line receivers 200. The value of sin $\phi$ from the shadow computer 129 is used directly as $Z_2$. The values cos $\theta$ and cos $\phi$ are input to PROM 202 in a table lookup operation to generate the value of $Y_2$, and the values sin $\theta$ and cos $\phi$ are input to PROM 204 in a table lookup operation to generate the value $X_2$.

The purpose of the shadowing processor 129 is to provide a blanking signal to the pixel to be displayed if it is shadowed by the terrain in front. FIG. 11 is a block diagram of the shadowing processor 129. The computed quantities (h−z+c) and RG are input to line receivers 220 and 221, respectively, of the shadowing processor 128 from the ground/slant range converter 130. As will be described in more detail with respect to FIG. 12, h is the altitude, z is the elevation, c is the earth curvature, and $R_G$ is the ground range. Two consecutive sets of these values are latched in registers 222, 223 and 224, 225 for two successive ground range positions. These values are cross multiplied in multipliers 226 and 227 and compared in comparator 228 by the following inequality:

$$[(h-z+c)_i] \mathrm{x} R_{Gi+1} \geq [(h-z+c)_{i+1}] \mathrm{x} R_{Gi}$$

This comparison determines whether the terrain at $R_{Gi}$ position is shadowed or not. FIG. 11A shows the geometry for shadowing. If the inequality is true, then it means that the tangents of the depression angles of the pixel i+1 is smaller than pixel i. In FIG. 11A, only at the top of the hill is this condition met, and shadowing of the terrain would then start.

In the shadowing generator 129, the blanking signal A from flip-flop 229 is triggered when shadowing occurs. However, the shadowing of the back of the hill requires some additional logic and circuitry. When the inequality condition is met as shown in FIG. 11A, the values in the second set of latches 223, 225 remain locked by the output of NAND gate 230 for a period of time as the ground range $R_G$ continues to increment away from ownship. As long as the inequality remains true, the blanking signal is applied for shadowing for the ground range covered for the hill behind. As shown in FIG. 11A, as the ground range increments between A and B, the inequality is satisfied. As ground range continues to increment and when point B on the terrain is reached, the inequality is not true and the blanking signal is disabled to discontinue shadowing. The second level of latches 223, 225 is enabled, ready to receive new data.

The second part of the circuitry is to generate the cosines and sines of the depression angle. The depression is calculated from the following equation:

$$\phi = \tan^{-1}\frac{h - z + c}{R_G}$$

The height above terrain (h−z+c) data from line receiver 220 is an address to PROM 231 which also receives the range scale values through line receiver 232. PROM 231 shifts the (h−z+c) value so that it is in the same scale as the ground range $R_G$. Then the most significant 7 bits of (h−z+c) and that of $R_G$ from line receiver 221 are input to PROMs 233, 234, 235, and 236 for a table lookup for $\phi$ in the first quardrant. Because of the singular behavior of the tangent function at 90 degrees, different PROMs are used for table lookups. From the sign of (h−z+c), whether the terrain is above the aircraft, below or horizontal with the aircraft is decoded by decoder 237. The decoded values are the enable signals for the PROMs 233 to 236 for table lookup in any of the above three cases. The angle 90-$\phi$ is evaluated in PROM 238, assuming $\phi$ is offset binarily weighted with 10000000 being straight up, 00000000 being horizontal, and 01111111 being straight down. The 90-$\phi$ value is then used as an address to cosine PROM 239 and sine PROM 240 to give 8-bit inputs to the aspect computer 128 via latches 241 and 242. The 90-$\phi$ value from PROM 238 is also stored in latch 243.

Figure 12:
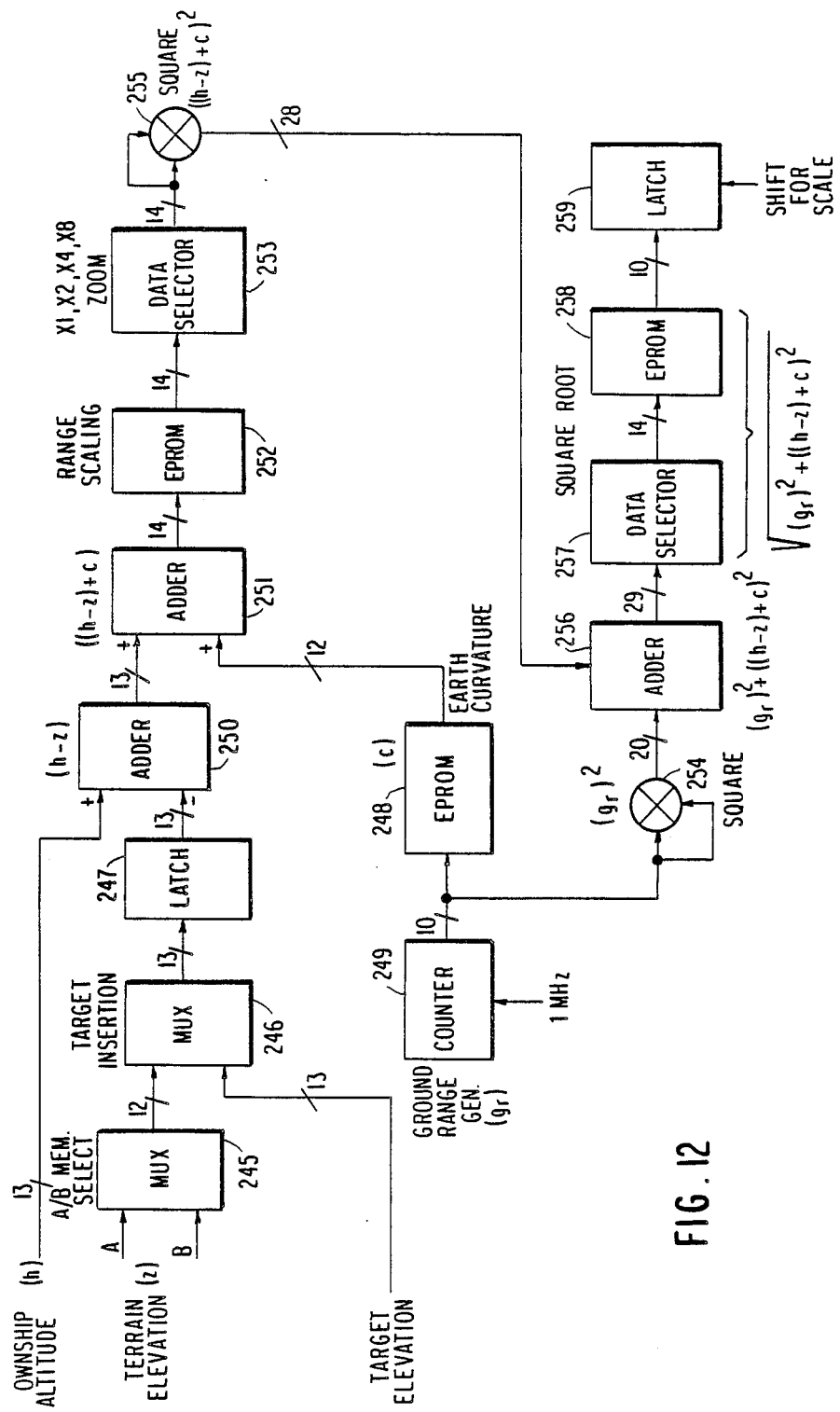
FIG. 12 is a block diagram of the converter hardware used in the DRLMS according to the invention.

The ground/slant range converter 130 is shown in FIG. 12. After the various reconstructed raw radar data have filled the respective image memories, the digital scan generator 115 then generates the X,Y addresses for a pixel in the image memories at the display pixel rate. The data are ready for radar processing; however, the radar data are retrieved in X,Y position at a ground range along a sweep in the radar PPI (plan position indicator) scan. In the aircraft, the display is in slant range format. The ground/slant range converter's function is to convert the ground range to the slant range, knowing the elevation of the ground and the ownship altitude. The following equation is used:

$$R_S = \sqrt{R_G^2 + (h - z + c)^2}$$

In this equation, c is the depression due to the 4/3 earth curvature and atmospheric refraction, h is the ownship altitude, and z is the elevation of the terrain. Both $R_G$ and $R_S$ are dependent upon the scaling selected for the display.

12 bits of elevation data z are retrieved from the image memory 119 via multiplexers 245 and 246 and latched in register 247. The X,Y addresses are provided by the digital scan generator 115. Since the image memory 119 is a ping-pong memory, the output of each half of the memory must be multiplexed by multiplexer 245. The multiplexer 246 is used to insert target elevation data from target buffer 134. The earth curvature programmable read only memory (PROM) 248 stores the elevation depressions in ground range to simulate the 4/3 earth curvature and atmospheric refraction. Counter 249 provides up to 1024 ground ranges at the clock rate of 1000 nsec. After the PROM 248 receives range scale and ground range, it then outputs the earth depression value.

Through two adders 250 and 251, the absolute value of terrain elevation, taking into account the earth curvature and atmospheric refraction, is calculated at the pixel rate. This value is scaled in PROM 252 and supplied to data selector 253 for zoom operations. Both (h−z+c) and $R_G$ are squared by multipliers 254 and 255, respectively, and added in adder 256. The resulting sum is supplied through data selector 257 as an address to PROM 258 to read out the square root by table lookup operation and latched in register 259. The PROM 258 for the table lookup is designed such that a 10-bit slant range accuracy for the display is ensured regardless of the scaling. In addition to providing the slant range for display, the absolute range information is determined, by shifting the data in latch 259 to scale the computed slant range, for range and atmospheric attenuation by the radar equation module 133.

The target generator 135 inserts air targets into the digital radar generator and provides the information for the display. The air targets are updated as the visual update rate and include the positions relative to the craft, target altitudes, the reflectivities and aspects. These values are then inserted into the target buffer 134. When a target is detected, the landmass simulator processes the target data instead of the landmass data using the same hardware such as the shadowing computer 129 and so forth.

Figure 13:
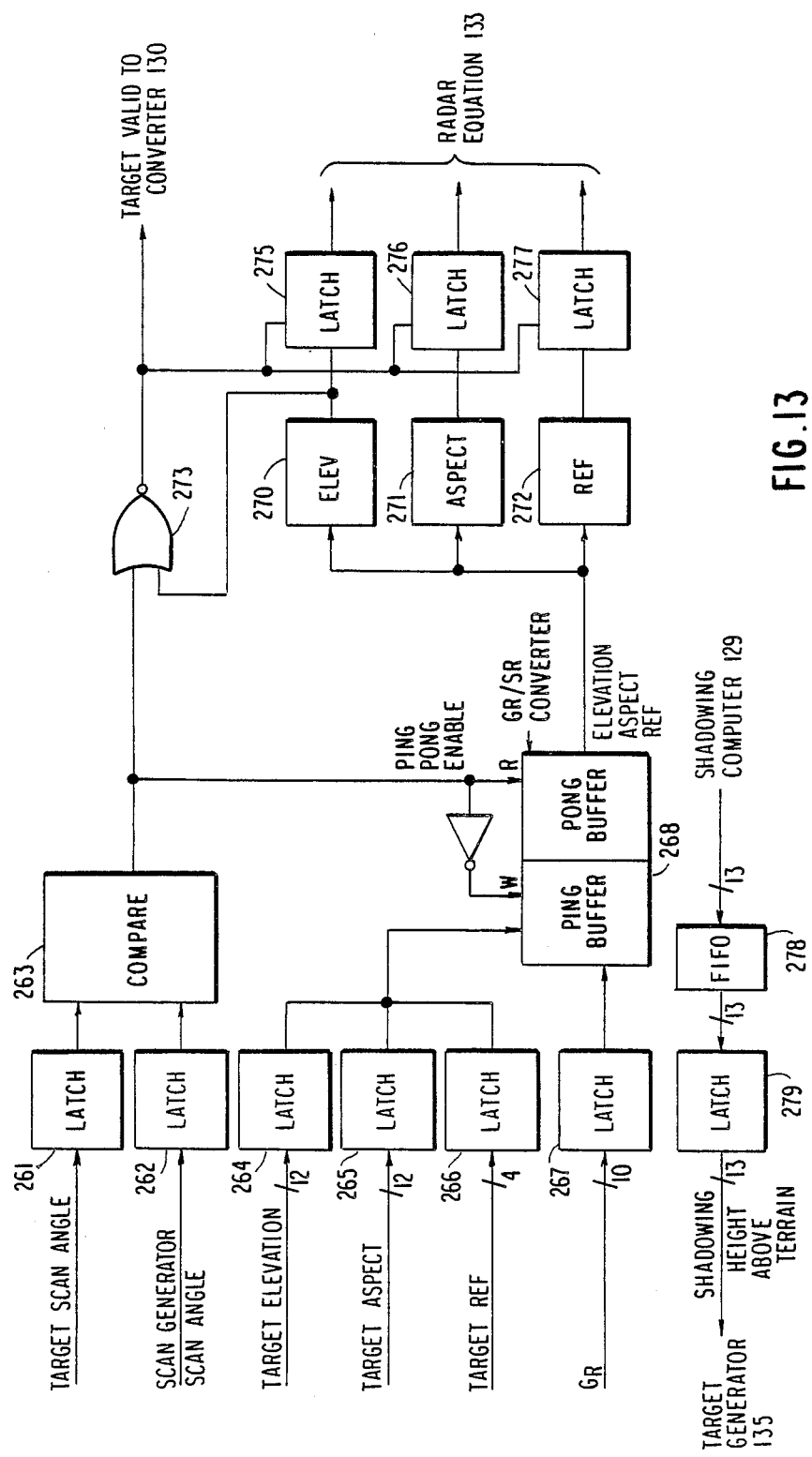
FIG. 13 is a block diagram of the target buffer hardware used in the DRLMS according to the invention.

In the target buffer 134 shown in FIG. 13, target scan angle is latched by the target generator 135 in latch 261 and compared with the scan angle from scan generator 115 in latch 262 in comparator 263. The elevation, aspect and reflectivity of the target from target generator 135 are latched in latches 264, 265 and 266, respectively. The target generator 135 provides the ground range to latch 267 which is an address to the ping-pong memory 268 of the target buffer 134. The conversion of the Cartesian coordinates of the targets to polar coordinates is done in the target generator 135. The target generator keeps track of the position of the PPI sweep angle. It will insert the target elevation, aspect and reflectivity values at the ground range position address in the ping side of the memory buffers, ahead of the present sweep. In the target buffer 134, if the scan angle of the target is equal to the scan angle of the scan generator 115, then the ping-pong buffer 268 is flipped; i.e., the target elevation, aspect and reflectivity are read out to registers 270, 271 and 272, respectively, instead of the landmass data if there is an air target at that ground range location. The air target detection circuitry resides at the target buffer, where a non-zero elevation is detected at the NOR gate 273. The target valid signal from the NOR gate 273 is sent to the converter, where the elevation of the terrain is subtracted from the air target altitude to give target height above terrain. When an air target is processed, the terrain data is stopped for one cycle to allow the target elevation, aspect and reflectivity data to be displayed instead of the terrain. The elevation, aspect and reflectivity data are temporarily stored in latches 275, 276 and 277, respectively, before being inserted to the landmass. The air target elevation is also passed through the shadowing computer for shadowing calculations. If an air target is shadowed by the terrain, then the shadowing detection bit would be passed to the target generator 135 through the target buffer's FIFO buffer 278 and latch 279, along with the air target height above terrain generated from the ground/slant range converter. The target buffer 268 can accept up to 512 air targets along a sweep.

The radar equation module 133 constitutes the final stage of the digital radar generator processing. It receives the input radar parameters and processed data from different digital radar generator modules and calculates the radar returns by the radar equation. The landmass/surface targets and the air targets are now indistinguishable pixeled data for the radar equation module to process. It also includes the final stage of the weather processing, range processing, sensitivity time control (STC), antenna tilt, far shore brightening, atmospheric attenuation, and pulse stretch. The radar equation module 133 is programmable to simulate a given radar. The block diagram is shown in FIG. 14.

In the radar equations, the power is a function of the inverse range to the fourth power. The slant range is sent to the radar effect module 281 from the ground/slant range converter 130 where it is raised to the fourth power then inverted through a log table lookup before combining with the radar equation. Sensitivity time control (STC) input to the radar effect module 281 is an intensity control at the display, used to compensate the high intensity returns at the center. The STC function may vary dependent upon the particular type of radar. In the present design, the slope of the exponential curve is programmable for the application the amplitude can also be adjusted by varying the total amplitude constant for the radar equation. The atmosphere contains vapors and aerosols which attenuate radar energy. A function has been added to provide exponential attenuation with range. The attenuation constant is provided by the host computer 114. The effect is implemented in the radar effect module through table lookup.

The power return by the DRLMS is "stretched" in the slant range by pulse shaper 282 to account for the distortion in range due to a realistic pulse length error. Dependent upon the range scale and the type of radar being simulated, the spread is different. The extent of the spread and multiplication weights are provide by the host computer 114. The radar returns of consecutive pixels are stored in latches 283, 284, 285, and 286 and multiplied by the weighting factors, which are based on the radar being simulated and the range scale selected.

In weather processing, the radar equation receives the weather map information and processes it according to whether it is used for backscattering or attenuation. In backscattering, the reflectivity map is displayed on the screen. In the weather attenuation of the terrain, the modulated terrain returns are displayed. These are superimposed on each other to give the composite display of both backscattering and attenuation. The same weather map is used for both backscattering and attenuation. A PROM 288 is used for conversion of the weather map for backscattering and for attenuation. After the attenuation factor is read from the PROM 288, it is multiplied by the terrain/target returns before outputting to the display interface.

Figure 15:
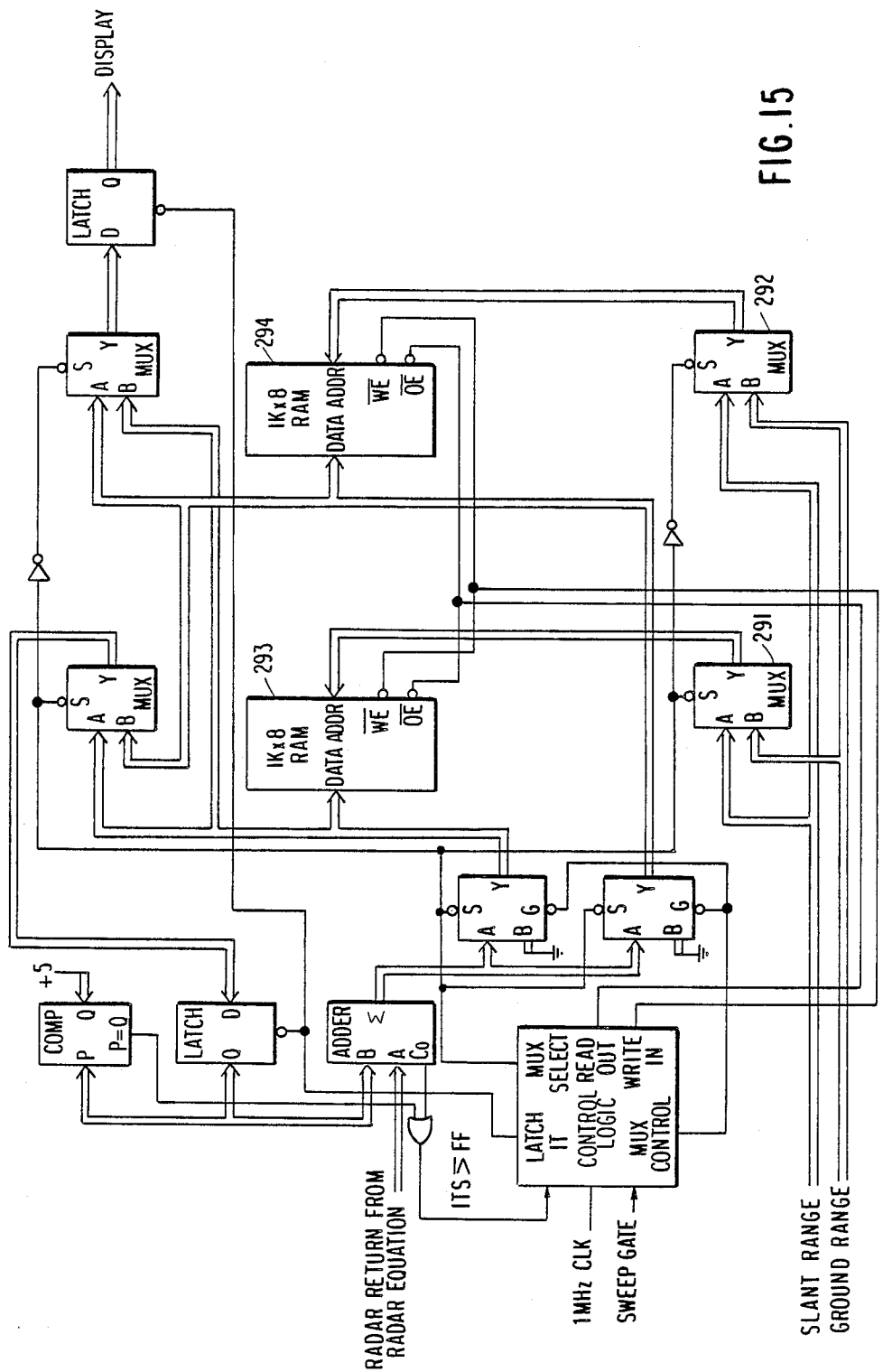
FIG. 15 is a block diagram of the sorter hardware used in the DRLMS according to the invention.

The block diagram of the sorter 136 is shown in FIG. 15. The slant range sorter is a bucket sort ping-pong memory system that receives radar returns in slant range or ground range per scan and outputs in ground range or slant range order. The terrain information is sorted during the PPI sweep and the air target and weather information are sorted during the retrace time. This module is needed because the radar returns of different ground ranges may add together to provide a return for a slant range position. The module has circuitry to accumulate returns at the same slant range from different ground range contributions. It provides a cut-off value when the intensity exceeds the maximum value allowed for the display. After the radar intensity is read out for display, the memory is ready for the next sweep of data. There is on board circuitry to clear the memory before it is loaded with the data for the next spoke.

In FIG. 15, radar intensity corresponding to a ground range is supplied via multiplexers 291 and 292 and added to the value already in the static RAM sorter memories 293 and 294. During the initialization process, the memory is cleared; i.e., zero is multiplexed into all the memory locations. There are two sets of addresses to the ping-pong memories provided, indicated by the ground range and slant range inputs. The control and timing for these are independent. The output of the data from the pong side 294 is in synchronization during the PPI sweep. The input of the data to the ping side 293, however, is not restricted by the display clock. This method allows the loading of the radar data to the sorter ping memory 293, even during the retrace time of the PPI sweep. The air target and the weather backscattering data are loaded during the retrace time.

Figure 16:
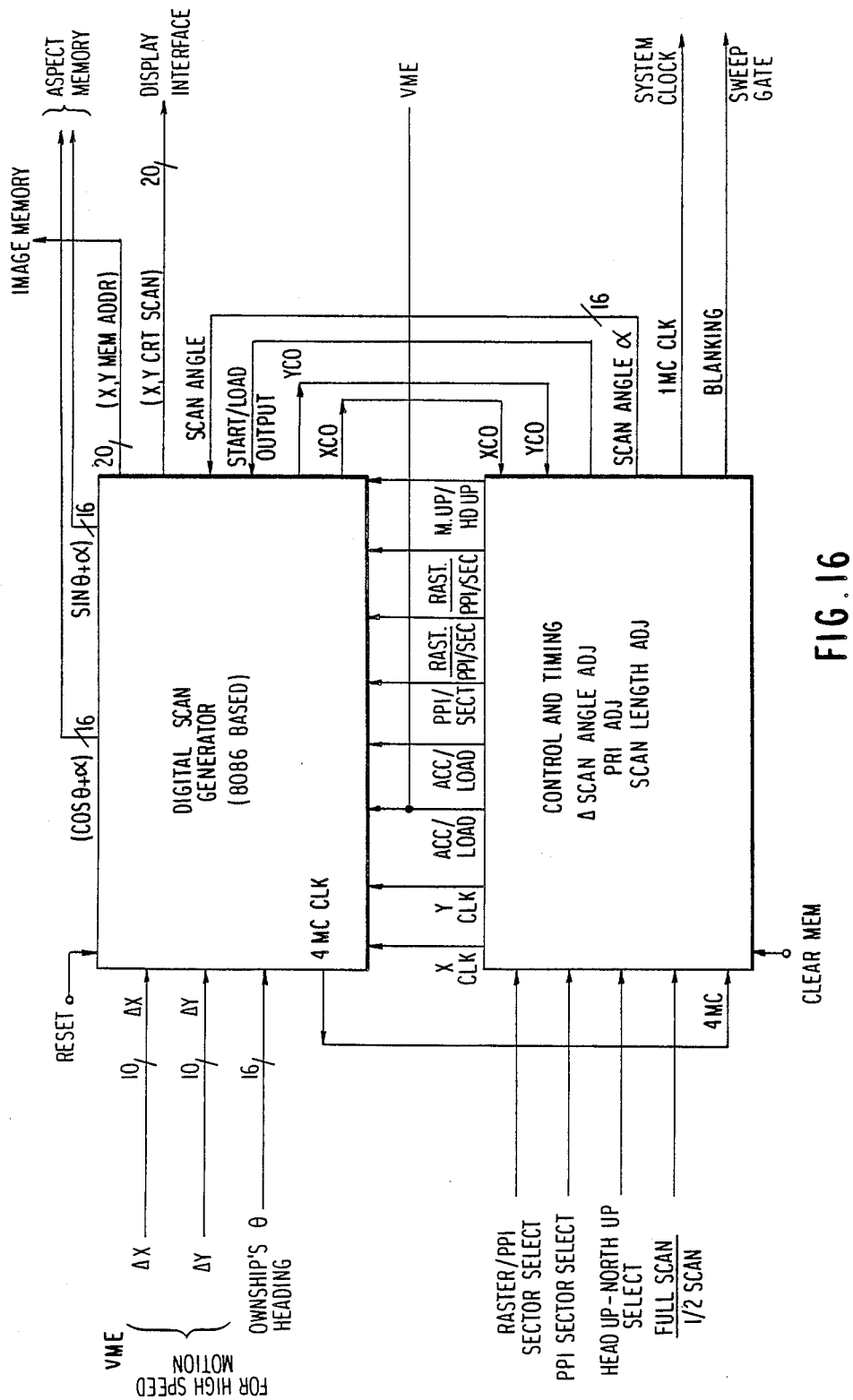
FIG. 16 is a block diagram of the scan generator hardware used in the DRLMS according to the invention.

The digital scan generator and the timing and control 115 provide the signals for scan generation and timing for the entire system. FIG. 16 shows the block diagram of this subsystem. There is an 8086 microprocessor residing in the digital scan generator which receives input controls and allows for the flexibility of changing modes via software. The scan control words, i.e., mode select, variable scan rate, heading, scan length and scan boundaries are latched before being input to its microprocessor memory. The microprocessor then calculates angle of the spoke. Then the arithmetic co-processor calculates X,Y positions of the pixels along a spoke in real time for display and data retrieval from the image memories. Note that there, can be a position offset between ownship relative to the image and the scan origin with respect to the display.

In general, during the data retrieval process, as described previously, given the ownship position X,Y and the range scale, for each channel, the microprocessor for that channel will generate the addresses for four blocks of data on the disk to send them to the decompressor for that channel. After the decompression process, the image memories are then filled with the reconstructed data of $1024 \times 1024$ pixels with ownship at the center. The update of the image memories is about two seconds; however, for high speed ground motion relative to the ground data in the tile, many ground pixels may be passed by ownship before each two second update. To achieve an update rate of 60 Hz of the ground relative to ownship, the scan generator can provide sweeps with an offset to the center of the image memories. In providing the sweep, a region somewhat less than 1024×1024 pixels is scanned and the scan generation allows ownship translation within the terrain tile in the image memories. The required data for the radar display is continuously updated at the rate the information of ownship position is provided to the scan generator. In the present design, the scan generator accepts continuous offsets X,Y at a 60 Hz rate. The pixels positions along the spoke are calculated accordingly by the scan generator for retrieving the data from the image memories. The smaller scan sweep radius prevents the retrieval of data off the tile boundary. For most applications, the display resolution is only 512×512. There is a lot of room for movement of ownship within the 1024×1024 boundary tile before the update of the tile.

The scan generator 115 can operate either in north-up or head-up mode. In the head-up mode, the scan generator latches ownship's heading offset angle $\theta$ relative to the vertical axis. The instantaneous scan angle $\alpha$, also relative to the vertical axis, is calculated by a software counter in the microprocessor at the given sweep rate. The microprocessor in the scan generator then adds these two angles to give the angle of the spoke in the image memories and the display. However, both the display and the image memories accept only positions in rectangular coordinates. The scan generator actually converts the display coordinates from polar to rectangular form by using table lookups for the sine and cosine of the angles, and hardware adders give the pixel update rate as required. The same first quadrant sine and cosine tables are used even though the sweep angle may be in any of the other three quadrants. The microprocessor program makes the necessary sign adjustments needed in the equation of polar to rectangular transformation. The resultant 10-bit accuracy in X and Y from the accumulators warrants 16-bit accuracy in the sine and cosine calculation so as to reduce the accumulated errors.

The scan generator provides different display modes; i.e., raster scan, sector scan, PPI scan, scans of different rates and different spans. The X,Y origin for PPI mode is at the center of the display; for raster mode, it is at the left top corner; for sector mode, it is at the bottom of center depending on whether it is a 360 degree scan or a sector scan. For each mode, the respective X and Y displacements are loaded into the accumulators as the base values prior to the adding of the X and Y delta increments during polar to rectangular coordinate transformation.

In raster mode, the angle $\theta$ is given a default of 90 degrees for horizontal sweep, since head-up position is defined as angle zero. The X scans from 0 to 1024 pixels across the tile instead of the normal PPI scan of 512 pixels from the center. The number of scans is 1024 in the Y direction instead of the 2048 spokes for the 360 degree scan. For variable scan rates, the scan actually repeats the same sweep a number of times to simulate a slower scan rate. There is no visible increase of intensity. For different scan orientations and variable scan coverage, the microprocessor of the scan generator is given a start and finish sweep angle, the software counter increments from the start and decrements from the finish.

While the invention has been described in terms of a single preferred embodiment representing the best mode of practicing the invention, those skilled in the art will recognize that the invention can be practiced with modification within the spirit and scope of the appended claims.

Having thus described my invention, what I claim as novel and desire to secure by grant of Letters Patent is a follows:

1. A method of real time data retrieval in data radar landmass simulation comprising the steps of:
    compressing off line digital feature analysis and digital terrain elevation data as compressed aspect, elevation and reflectivity data bases for the simulation;
    separately storing the compressed aspect, elevation and reflectivity data bases for later access and decompression for the simulation;
    synchronously and continuously accessing the compressed aspect, elevation and reflectivity data and decompressing and temporarily storing the decompressed data;
    generating radar incident vectors;
    processing the temporarily stored aspect data to produce surface normals and calculating vector dot products between said radar incident vectors and the surface normals to generate radar aspect returns;
    processing the temporarily stored elevation data and calculating shadowing due to elevation and slant range as a function of ground range; and
    processing the temporarily stored reflectivity data, the calculated radar aspect returns, shadowing and slant range and calculating terrain radar return.

2. The method recited in claim 1 further comprising the step of inserting target aspect and reflectivity information in the oaloulated terrain radar return at corresponding range positions.

3. The method recited in claim 1 wherein the step of compressing includes compressing off line weather data as a compressed weather data base for the simulation, said compressed weather data base being separately stored for later access and decompression for the simulation, further comprising the step of synchronously and continuously accessing the compressed weather data and decompressing and temporarily storing the data, said step of calculating the terrain radar return including processing said temporarily stored weather data and modifying the calculated radar return based on the weather data.

4. The method recited in claim 1 wherein said reflectivity data is run length compressed, said elevation data is compressed by a differential coding technique, and said aspect data is compressed using a combination of run length coding and differential coding.

5. A digital radar landmass simulator comprising:
    first, second and third channels for storing respectively compressed aspect, elevation and reflectivity data and synchronously and continuously retrieving and decompressing said compressed data in real time, each of said channels including a microprocessor operating as a channel controller, the microprocessors of said channels being connected to a common bus, one of said microprocessors being a master microprocessor and maintaining synchronism of said channels;
    means for generating a scan and depression angles and computing radar incident vectors;
    aspect computer means connected to said first channel and responsive to decompressed aspect data for processing the data to produce surface normals and calculating vector dot products between said radar incident vectors and the surface normals to generate radar aspect returns;

shadowing and converter means connected to said second channel and responsive to decompressed elevation data for calculating shadowing due to elevation and slant range as a function of ground range;

radar equation means connected to said third channel, said aspect computer means and said shadowing and converter means and responsive to decompressed reflectivity data, said calculated radar aspect returns, shadowing and slant range for calculating terrain radar returns; and display means connected to said radar equation means and responsive to said calculated terrain radar returns for displaying a simulated radar image.

6. The digital radar landmass simulator recited in claim 5 further comprising target generator means connected to said radar equation means for inserting target aspect and reflectivity information in the calculated terrain radar return at corresponding range positions.

7. The digital radar landmass simulator recited in claim 5 wherein each of said first, second and third channels comprises:

direct access storage means for storing compressed data;

dedicated decompressor means for decompressing said compressed data, said microprocessor accessing compressed data stored in said direct access storage means and supplying the data to said dedicated decompressor means; and image memory means connected to said dedicated decompressor means for temporarily storing decompressed data, said image memory means including first and second memory areas, data being read from one of said areas as data is written to the other of said areas and then vice versa in alternate data memory cycles.

8. The digital radar landmass simulator as recited in claim 7 further comprising general purpose data processing means for compressing off line digital feature analysis and digital terrain elevation data as compressed aspect, elevation and reflectivity data and temporarily storing said compressed data on the direct access storage devices of said first, second and third channels, respectively.

9. The digital radar landmass simulator as recited in claim 8 wherein said compressed reflectivity data is run length compressed and wherein said dedicated decompressor of said third channel is a run length decompressor.

10. The digital radar landmass simulator as recited in claim 9 wherein said compressed elevation data is compressed using a differential coding technique and said dedicated decompressor of said second channel is a differential code decompressor.

11. The digital radar landmass simulator as recited in claim 9 wherein said compressed aspect data is compressed using a combination of run length compression and a differential coding technique and said dedicated decompressor in said first channel is a hybrid run length and differential decompressor.

12. The digital radar landmass simulator as recited in claim 5 further comprising:

a fourth channel for storing compressed weather data and synchronously and continuously retrieving and decompressing said compressed data in real time, said fourth channel including a microprocessor operating as a channel controller and connected to said common bus; and weather attenuator means connected to said fourth channel for receiving said decompressed weather data and providing an output to said radar equation means to modify said calculated terrain radar returns.

* * * * *